United States Patent
Petunin et al.

(10) Patent No.: US 7,305,648 B2
(45) Date of Patent: Dec. 4, 2007

(54) DISTRIBUTED AUTOROUTING OF CONDUCTIVE PATHS IN PRINTED CIRCUIT BOARDS

(75) Inventors: Vladimir V. Petunin, Longmont, CO (US); Charles L. Pfeil, Louisville, CO (US); Alexander N. Starkov, Istra (RU); Venkat Natarajan, Lafayette, CO (US); Edwin Franklin Smith, Huntsville, AL (US)

(73) Assignee: Mentor Graphics Corporation, Wilsonville, OR (US)

( * ) Notice: Subject to any disclaimer, the term of this patent is extended or adjusted under 35 U.S.C. 154(b) by 336 days.

(21) Appl. No.: 10/870,072

(22) Filed: Jun. 18, 2004

(65) Prior Publication Data

US 2005/0114821 A1    May 26, 2005

Related U.S. Application Data

(60) Provisional application No. 60/523,697, filed on Nov. 21, 2003.

(51) Int. Cl.
*G06F 17/50* (2006.01)
*G06F 9/455* (2006.01)
*G06F 9/00* (2006.01)
*G06F 15/16* (2006.01)

(52) U.S. Cl. .......................... 716/15; 716/11; 715/751; 709/203

(58) Field of Classification Search ............ 716/15, 716/11; 715/748, 751; 709/203, 205
See application file for complete search history.

(56) References Cited

U.S. PATENT DOCUMENTS

| 5,107,443 | A | 4/1992 | Smith et al. |
| 5,258,920 | A | 11/1993 | Haller et al. |

(Continued)

FOREIGN PATENT DOCUMENTS

EP    0750267    6/1995

(Continued)

OTHER PUBLICATIONS

Horn, I et al., "Estimation of the number of routing layers and total wirelength in a PCB through wiring distribution analysis", Design Automation Conference, 1996, Proceedings EURO-DAC '96, Sep. 16-20, 1996, pp. 310-315.*

(Continued)

*Primary Examiner*—Jack Chiang
*Assistant Examiner*—Magid Y. Dimyan
(74) *Attorney, Agent, or Firm*—Banner & Witcoff, Ltd.

(57) ABSTRACT

A server computer maintains a master database for a PCB design, and a copy of the PCB design is provided to multiple client computers. The server assigns each client a different pair of pins for which a connection must be routed. When a client completes an assigned routing task, it requests that the server update the PCB master design with the route found by the client for its assigned pin pair. After forwarding the request, the client does not update its copy of the PCB design to reflect the found route. Instead, the client returns its copy to the state occupied prior to assignment of the pin pair by the server. Upon receiving notification that the server incorporated the found route, the client updates its copy of the design to include that route.

30 Claims, 19 Drawing Sheets

U.S. PATENT DOCUMENTS

| | | |
|---|---|---|
| 5,333,312 A | 7/1994 | Wang |
| 5,333,315 A | 7/1994 | Saether et al. |
| 5,333,316 A | 7/1994 | Champagne et al. |
| 5,392,400 A | 2/1995 | Berkowitz et al. |
| 5,452,218 A | 9/1995 | Tucker et al. |
| 5,544,067 A | 8/1996 | Rostoker et al. |
| 5,555,388 A | 9/1996 | Shaughnessy |
| 5,583,993 A | 12/1996 | Foster et al. |
| 5,604,680 A | 2/1997 | Bamji et al. |
| 5,745,747 A | 4/1998 | Chang et al. |
| 5,826,265 A | 10/1998 | Van Huben et al. |
| 5,892,900 A | 4/1999 | Ginter et al. |
| 5,902,240 A | 5/1999 | Ishii et al. |
| 5,950,201 A | 9/1999 | Van Huben et al. |
| 5,966,707 A | 10/1999 | Van Huben et al. |
| 5,983,277 A | 11/1999 | Heile et al. |
| 6,023,565 A | 2/2000 | Lawman et al. |
| 6,026,230 A | 2/2000 | Lin et al. |
| 6,094,654 A | 7/2000 | Van Huben et al. |
| 6,094,658 A | 7/2000 | Araki |
| 6,110,213 A | 8/2000 | Vinciarelli et al. |
| 6,110,223 A | 8/2000 | Southgate et al. |
| 6,134,705 A | 10/2000 | Pedersen et al. |
| 6,182,115 B1 | 1/2001 | Cuomo et al. |
| 6,289,254 B1 | 9/2001 | Shimizu et al. |
| 6,327,594 B1 | 12/2001 | Van Huben et al. |
| 6,356,796 B1 | 3/2002 | Spruiell et al. |
| 6,424,959 B1 | 7/2002 | Bennett et al. |
| 6,484,177 B1 | 11/2002 | Van Huben et al. |
| 6,578,174 B2 | 6/2003 | Zizzo |
| 6,594,799 B1 | 7/2003 | Robertson et al. |
| 6,654,747 B1 | 11/2003 | Van Huben et al. |
| 6,671,699 B1 | 12/2003 | Black et al. |
| 6,678,871 B2 | 1/2004 | Takeyama et al. |
| 6,678,876 B2 | 1/2004 | Stevens et al. |
| 6,687,710 B1 | 2/2004 | Dey |
| 6,708,313 B2 | 3/2004 | Pfeil et al. |
| 6,711,718 B2 | 3/2004 | Pfeil et al. |
| 6,721,922 B1 | 4/2004 | Walters et al. |
| 6,742,165 B2 * | 5/2004 | Lev et al. ............ 716/1 |
| 6,782,511 B1 | 8/2004 | Frank et al. |
| 6,851,094 B1 | 2/2005 | Robertson et al. |
| 6,851,100 B1 | 2/2005 | You et al. |
| 6,983,434 B1 | 1/2006 | Frank et al. |
| 7,024,433 B2 | 4/2006 | Arai et al. |
| 7,036,101 B2 | 4/2006 | He et al. |
| 7,039,892 B2 * | 5/2006 | Mantey et al. ........ 716/15 |
| 7,076,491 B2 | 7/2006 | Tsao |
| 7,103,434 B2 | 9/2006 | Chernyak et al. |
| 7,134,096 B2 | 11/2006 | Brathwaite et al. |
| 7,143,134 B2 | 11/2006 | Petrie et al. |
| 7,143,341 B1 | 11/2006 | Kohli |
| 2002/0059054 A1 | 5/2002 | Bade |
| 2002/0069220 A1 | 6/2002 | Tran |
| 2002/0144212 A1 | 10/2002 | Lev et al. |
| 2002/0188910 A1 | 12/2002 | Zizzo |
| 2003/0009797 P1 | 1/2003 | Takeyama et al. |
| 2003/0101425 A1 | 5/2003 | Makinen et al. |
| 2003/0131332 A1 | 7/2003 | Pfeil et al. |
| 2004/0093397 A1 | 5/2004 | Chiroglazov et al. |
| 2004/0210854 A1 | 10/2004 | Pfeil et al. |
| 2004/0225988 A1 | 11/2004 | Petunin et al. |
| 2005/0044518 A1 | 2/2005 | Petunin et al. |
| 2005/0080502 A1 | 4/2005 | Chernyak |
| 2005/0125763 A1 | 6/2005 | Lin et al. |
| 2005/0131783 A1 | 6/2005 | Jin |
| 2005/0160396 A1 | 7/2005 | Chadzynski |
| 2005/0237776 A1 | 10/2005 | Gropper et al. |
| 2005/0246672 A1 | 11/2005 | Bois et al. |

FOREIGN PATENT DOCUMENTS

| | | |
|---|---|---|
| JP | 02-048774 | 2/1990 |
| JP | 02-056070 | 2/1990 |
| JP | 02-245865 | 10/1990 |
| JP | 04-068470 | 3/1992 |
| JP | 04-362783 | 12/1992 |
| JP | 05-073630 | 3/1993 |
| JP | 05-74942 | 3/1993 |
| JP | 05-242174 | 9/1993 |
| JP | 06203108 | 7/1994 |
| JP | 07-175842 | 7/1995 |
| JP | 08-235233 | 9/1996 |
| JP | 09-62726 | 3/1997 |
| JP | 09-212530 | 8/1997 |
| JP | 09-288690 | 11/1997 |
| JP | 10-105586 | 4/1998 |
| JP | 10-307855 | 11/1998 |
| JP | 11-288428 | 10/1999 |
| JP | 2003-186914 | 7/2003 |
| WO | 03/050726 | 6/2003 |
| WO | 03/050751 | 6/2003 |
| WO | WO 03/050726 | 6/2003 |

OTHER PUBLICATIONS

Michael K.W. Wu et al., "Development of an Integrated CAD Tool for Switching Power Supply Design with EMC Performance Evaluation," *IEEE Transactions on Industry Applications*, vol. 34, No. 2 pp. pp. 364-373, Mar.-Apr. 1998.

U.S. Appl. No. 60/341,037, filed Jun. 19, 2003.

Geppert, L., "IC Design on the World Wide Web," IEEE Spectrum, Oct. 2001, pp. 31-36.

Printout of web page at <http://www.stella.co.jp/system/data.htm> and English language translation thereof; date of first publication unknown, but prior to Sep. 9, 2003; (2 pages).

Printout of web page at <http://www.stella.co.jp/system/faq.htm> and English language translation thereof; date of first publication unknown, but prior to Nov. 18, 2003; (5 pages).

Printout of web page at <http://www.stella.co.jp/system/multl.htm> and English language translation thereof; date of first publication unknown, but prior to Sep. 9, 2003; (2 pages).

Printout of web page at <http://www.stella.co.jp/system/option.htm> and English language translation thereof; date of first publication unknown, but prior to Sep. 9, 2003; (2 pages).

Printout of web page at <http://www.stella.co.jp/system/pcb_cad.htm> and English language translation thereof; date of first publication unknown, but prior to Sep. 9, 2003; (2 pages).

Printout of web page at <http://www.stella.co.jp/system/print.htm> and English language translation thereof; date of first publication unknown, but prior to Sep. 9, 2003; (3 pages).

Printout of web page at <http:///www.stella.co.jp/system/stella_station.htm> and English language translation thereof; date of first publication unknown, but prior to Nov. 18, 2003; (3 pages).

Printout of web page at <http://www.stella.co.jp/system/system.htm> and English language translation thereof; date of first publication unknown, but prior to Sep. 9, 2003; (2 pages).

English language translation of web page formerly available at <http://www.ydc.co.jp/cad/epsilon/productC3Design/>; date of first publication unknown, but prior to Feb. 17, 2004; (6 pages).

CAD Framework Initiative, Inc., Printed from <http://www.si2.org>on Jun. 23, 2004 (date of first publication unknown).

International Search Report of PCT/US02/39347 dated Mar. 27, 2003.

International Search Report of PCT/US02/39394 dated Jun. 19, 2003.

Translation of an Office Action for JP2003551712 dated Aug. 21, 2006.

Translation of an Office Action for JP2003-551734 dated Aug. 21, 2006.

Hardwick, M., et al., "Using a Relational Database as an Index to a Distributed Object Database in Engineering Design Systems", IEEE, Oct. 16, 1989, pp. 4-11.

Anupam, V., et al., "Collaborative Multimedia Scientific Design in SHASTRA", 1993, pp. 1-12.

Anupam V., et al., "SHASTRA: Multimedia Collaborative Design Environment," IEEE Multimedia, vol. 1, No. 2, Jun. 21, 1994, pp. 39-49.

Anupam V., et al., "SHASTRA An Architecture for Development of Collaborative Applications", Enabling Technologies: Infrastructure for Collaborative Enterprises, Apr. 20-22, 1993, pp. 155-156.

Honghai, Shen, et al., "Access Control for Collaborative Environments", Oct. 31, 1992, pp. 51-58.

N. Shyamsundar, et al., "Internet-based Collaborative Product Design with Assembly Features and Virtual Design Spaces", Jun. 5, 2001, pp. 637-651.

EP Search Report for EP02795797 dated Oct. 20, 2006.

English translation of document titled "Exhibits and other documents" submitted Sep. 29, 2006 in Japanese Patent Application No. 2003-551734, pp. 1-5.

English Language Translation of Publication submission of Japanese Patent Application No. 2003-551734 dated Oct. 25, 2006.

English Language Translation of Japanese Kokai Patent Application No. Hei 5[1993]-242174 published Sep. 21, 1993 (filing No. Hei 4[1992]-41727).

English Language Translation of Japanese Kokai Patent Application No. Hei 11[1999]-288428, published Oct. 19, 1999 (filing No. Hei 10[1998]-91372.

English Language Translation of Japanese Kokai Patent Application No. Hei 9[1997]-288690, published Nov. 4, 1997 (filing No. Hei 8[1996]-122462.

English Language Translation of Japanese Kokai Patent Application No. Hei 2[1990]-245865, published Mar. 20, 1989 (filing No. Hei 1[1989]-65906).

English Language Translation of Japanese Public Patent Disclosure Bulletin No. 10105586, dated Apr. 24, 1998 (application 8-25457).

English Language Translation of Japanese Kokai Patent Application No. Hei 4[1992]-362783, published Dec. 15, 1992 (filing No. Hei 3[1991]-137766).

English Language Translation of Japanese Kokai Patent Application No. Hei 9[1997]-212530, published Aug. 15, 1997 (filing No. Hei 8[1996]-17325).

English Language Translation of Japanese Kokai Patent Application No. Hei 5[1993]-073630, published Mar. 6, 1993 (filing No. Hei 3[1991]-233515).

English Language Translation of Japanese Public Patent Disclosure Bulletin No. 08235233, dated Sep. 13, 1996 (application No. 7-38249).

English Language Translation of Japanese Kokai Patent Application No. Hei 2[1990]-056070, published Aug. 20, 1988 (filing No. Sho 63[1998]-205677).

English Language Translation of Japanese Kokai Patent Application No. Hei 7[1995]-175842 published Jul. 14, 1995 (filing No. Hei 5[1993]-345183).

English Language Translation of Japanese Kokai Patent Application No. Hei 4[1992]-293169 published Oct. 16, 1992 (filing No. Hei 3[1991]-57351).

English Language Translation of Japanese Public Patent Disclosure Bulletin No. 0696160, dated Apr. 8, 1994 (application No. 04244646).

English Language Translation of Japanese Public Patent Disclosure Bulletin No. 06203108, dated Jul. 22, 1994 (application No. 5-154).

English Translation of Toshio Hoshi, "e-PAL 2000" Printed Circuit Board CAD/CAM System, Denshi Zairyo [Electronic Parts and Materials], Oct. 2001, pp. 153-156 (copy of Japanese original included).

English Translation of Yoshiki Koyanagi: Stella Station Multi CAD/CAM System for the Next Generation of Printed Circuit Boards, Denshi Zairyo [Electronic Parts and Materials], Oct. 2000, pp. 96-101 (copy of Japanese original included).

English translation of Japanese Kokai Patent Application No. Hei 7 [1995]-98726, published Apr. 11, 1995 (filing No. Hei 5[1993]-311532), pp. 6-37.

English translation of Japanese Kokai Patent Application No. Hei 4[1992]-68470, published Mar. 4, 1992 (filing No. Hei 2[1990]-180448).

English translation of Japanese Kokai Patent Application No. Hei 5[1993]-74942, published Mar. 26, 1993 (filing No. Hei 3[1991]-259923).

English translation of Japanese Kokai Patent Application No. Hei 10[1998]-307855, published Nov. 17, 1998 (filing No. Hei 9[1997]-118134).

Translation of Japanese Patent Application No. Hei 2[1990]-48774, published Feb. 19, 1990 (filing No. Sho 63 [1988]-199358).

English language translation of Japanese Public Patent Disclosure Bulletin No. 9-62726, dated Mar. 7, 1997 (application 7-220142).

English translation of an Office Action for JP2003551712 dated May 29, 2007.

* cited by examiner

Netlist

| from pin | to pin |
|---|---|
| ⋮ | ⋮ |
| $21_a$ | $21_b$ |
| $22_a$ | $22_b$ |
| $23_a$ | $23_b$ |
| $24_a$ | $24_b$ |
| $25_a$ | $25_b$ |
| $26_a$ | $26_b$ |
| $27_a$ | $27_b$ |
| $28_a$ | $28_b$ |
| $29_a$ | $29_b$ |
| ⋮ | ⋮ |

Netlist

⋮

Pin pair *n*-4
Pin pair *n*-3
assigned→Pin pair *n*-2
Pin pair *n*-1
assigned→Pin pair *n*
Pin pair *n*+1
Pin pair *n*+2
Pin pair *n*+3
Pin pair *n*+4
Pin pair *n*+5

DISTRIBUTED AUTOROUTING OF CONDUCTIVE PATHS IN PRINTED CIRCUIT BOARDS

CROSS-REFERENCE TO RELATED APPLICATIONS

This application claims the benefit of U.S. Provisional Application Ser. No. 60/523,697, filed Nov. 21, 2003, titled "A Revolutionary Design Technology," which application is incorporated by reference.

FIELD OF THE INVENTION

This invention relates to the field of electronic design automation tools. More specifically, embodiments of the invention pertain to routing of conductive paths for electronic circuits, including the routing of traces in a printed circuit board (PCB) design.

BACKGROUND OF THE INVENTION

Electronic circuits typically have numerous electronic components such as resistors, integrated circuits (IC), capacitors, diodes, transistors, etc. Each of these components has connection points (or pins) where that component is electrically joined to one or more other components by some sort of electrical conductor. For circuits put onto a printed circuit board (PCB), the component pins are connected with conductive strips (or traces) located on (or within) the board. In many cases, the electrical circuit is first described in a schematic diagram. The schematic will usually show the circuit components as conventional symbols (e.g., a zig-zag line for a resistor, a rectangular box for an IC, etc.) interconnected by lines joining the symbolically-represented components. Based on the components set forth in the schematic and the required electrical connections between those components, the arrangement (or placing) of the physical components on a PCB is determined. Traces are then routed between pairs of pins which must be electrically connected.

As an electronic circuit become more complex, the design of a PCB for that circuit becomes more difficult. Because of this complexity, numerous designers will often work on the same PCB design. U.S. Pat. No. 6,708,313, titled "Parallel Electronic Design Automation: Shared Simultaneous Editing" and incorporated by reference herein, describes systems and methods permitting multiple designers to simultaneously work on the same PCB design. As used therein, "designer" includes both human designers and software applications performing design functions. In at least one embodiment, a server computer maintains a PCB design, and copies of that design are located on multiple client computers. Each client is able to view the entire PCB design. As edits to that design are made at the clients, those edits are transmitted to the server as requests to edit the design. After the server performs a design rule check (DRC) to confirm a requested edit will not conflict with another edit or otherwise violate a restriction imposed on the PCB design (e.g., minimum separation between traces, etc.), the server applies the requested edit to the design. The applied edit is then broadcast to the clients for update of the PCB design copies at those clients.

Even when multiple designers simultaneously work upon the same PCB design, the process can be very time-consuming. One of the most time-consuming aspects of the design process is routing of conductive paths between the electronic components. Unlike a schematic diagram, where connection lines frequently cross one another, intersecting traces on a PCB can result in a short circuit or other undesired consequences. After all the components of a circuit have been assigned a location (or placed) on the board, connections between the pins must be routed so that only the desired electrical connections are made. In some cases, a PCB may have hundreds or thousands of pins which must be interconnected. A given route for a particular connection will often foreclose available routes for other connections. As more and more connections are routed, the available routing space is reduced, and the task of routing remaining connections becomes more difficult. Although multiple layer PCBs relieve this problem somewhat by providing more space to route connections, the task remains extremely complex. Frequently, a large number of connections will be routed before it is discovered that previously-routed connections must be "ripped up" and rerouted.

Because manual routing of a PCB by human designers consumes so much worker time, numerous algorithms have been created to automate the routing process ("autorouting"). For even moderately complex circuits, however, existing algorithms require an extremely large amount of time to route an entire PCB. Indeed, it is common for PCB designers to start an autorouting program at the end of a business day and allow the program to run all night. One possible solution to these long run times is to distribute the routing task among multiple computers. Routing programs used for design of integrated circuits (ICs) have previously been converted to operate in a distributed environment. However, the routing problems for PCBs are much different than those associated with IC routing. For example, functional components of an IC tend to be more localized than in a PCB, where it is often necessary for a trace to span the entire width and/or length of a board. This lack of localization causes difficulty in apportioning regions of a PCB design for routing, as well as problems in joining sections routed by separate designers (whether human or automated). The elements of an IC tend to be closer to the same size (at least at the transistor level), and there is often no significant cost associated with connecting conductive paths in different levels of the chip. Conversely, components placed on a PCB can have widely ranging sizes, and this size range can seriously complicate a routing problem. Moreover, manufacturing costs often dictate that "vias" connecting traces on different PCB layers be minimized. For these and other reasons, distributed autorouting approaches used for IC design are of limited value in PCB design. Indeed, many have assumed that distributed PCB autorouting will require that a new type of routing algorithm first be developed, and that existing routing algorithms cannot effectively be used by multiple computers to route a single PCB.

SUMMARY OF THE INVENTION

Embodiments of the invention allow autorouting to be performed in a more rapid manner, and permit routes for a PCB design to be generated by multiple computers using existing routing algorithms. In at least some embodiments, a server computer maintains a master database for the PCB design. That database contains information about the circuit components and their placement, design rules for the PCB design, and various other information. A copy of the PCB design is provided to multiple client computers. The schematic (or other design data for) an electronic circuit is used to generate a list of all pairs of circuit component pins which must be connected. This list (or netlist) is sorted by the server. For each client, the server assigns a different pair of pins for which a connection must be routed. When a client completes an assigned routing task for a given pin pair, it forwards the results to the server. In particular, the client requests that the server update the PCB master design with the route that the client found for its assigned pin pair. After forwarding the edit request, the client does not update its copy of the PCB design to reflect the edit. Instead, the client returns its copy to the state occupied prior to assignment of the pin pair by the server.

In at least a first embodiment, the invention includes a method for routing conductive paths for a printed circuit board (PCB). The method includes assigning a component pin pair to each of a plurality of client computers configured to automatically route a conductive path between two component pins. The method also includes receiving from each client a proposed route for a conductive path connecting the client's assigned pin pair. The routes are incorporated into a master PCB design, and the steps of the method are repeated. A second embodiment includes a machine-readable medium containing instructions for performing a method of the first embodiment.

In at least a second embodiment, the invention includes another method for routing conductive paths for a printed circuit board (PCB). The method includes receiving a pin pair assignment, the assignment identifying pins of one or more components of an electronic circuit for which a connecting conductive path is to be routed. The method further includes automatically finding a route for a conductive path between the identified pins, transmitting an edit request proposing the found route, and receiving an indication that the proposed route is incorporated into a PCB design. Subsequent to receipt of the indication, a local copy of the PCB design is updated to include the found route. A fourth embodiment includes a machine-readable medium containing instructions for performing a method of the third embodiment.

These and other features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 3 is a netlist for the PCB design of FIG. 2.

FIG. 15 illustrates a netlist with pin pairs in descending order of separation distance.

DETAILED DESCRIPTION OF THE PREFERRED EMBODIMENTS

At least some embodiments distribute autorouting for a PCB design among multiple computers operating conventional autorouting algorithms. Preliminary testing indicates that, when routing large and complex PCBs, there is approximately a 0.75 performance ratio to the number of computers. In other words, if routing a PCB using four client computers, the PCB will be routed approximately three times faster than if routed using a single computer. In at least some embodiments, a server computer maintains a master database for the PCB design. That database contains information about the circuit components and their placement, design rules for the PCB design, and various other information. A copy of the PCB design is provided to multiple client computers. The schematic (or other design data for) the electronic circuit is used to generate a list of all pairs of circuit component pins which must be electrically connected. This list (or netlist) is then sorted by the server. For each client, the server assigns a different pair of pins for which a connection must be routed. When a client completes an assigned routing task for a given pin pair, it forwards the results to the server. In particular, the client requests that the server update the PCB master design with the route that the client found for its assigned pin pair. After forwarding the edit request, the client does not update its copy of the PCB design to reflect the edit. Instead, the client returns its copy to the state occupied prior to assignment of the pin pair by the server.

After receiving the edit request from the client, the server performs a design rule check (DRC) for the route found by the requesting client. If the route passes the DRC, the server applies the edit request to the master design to include the route. The server forwards an update to all clients to modify their PCB design copies to reflect the new route. The server also assigns a new pin pair to the client which found the newly-applied route. If the edit request fails the DRC, the server does not update the PCB master design. Instead, the server instructs the client sending the request to retry routing the previously-assigned pin pair, or to route another pin pair. Further aspects and additional embodiments of the invention are described below.

Figure 1:
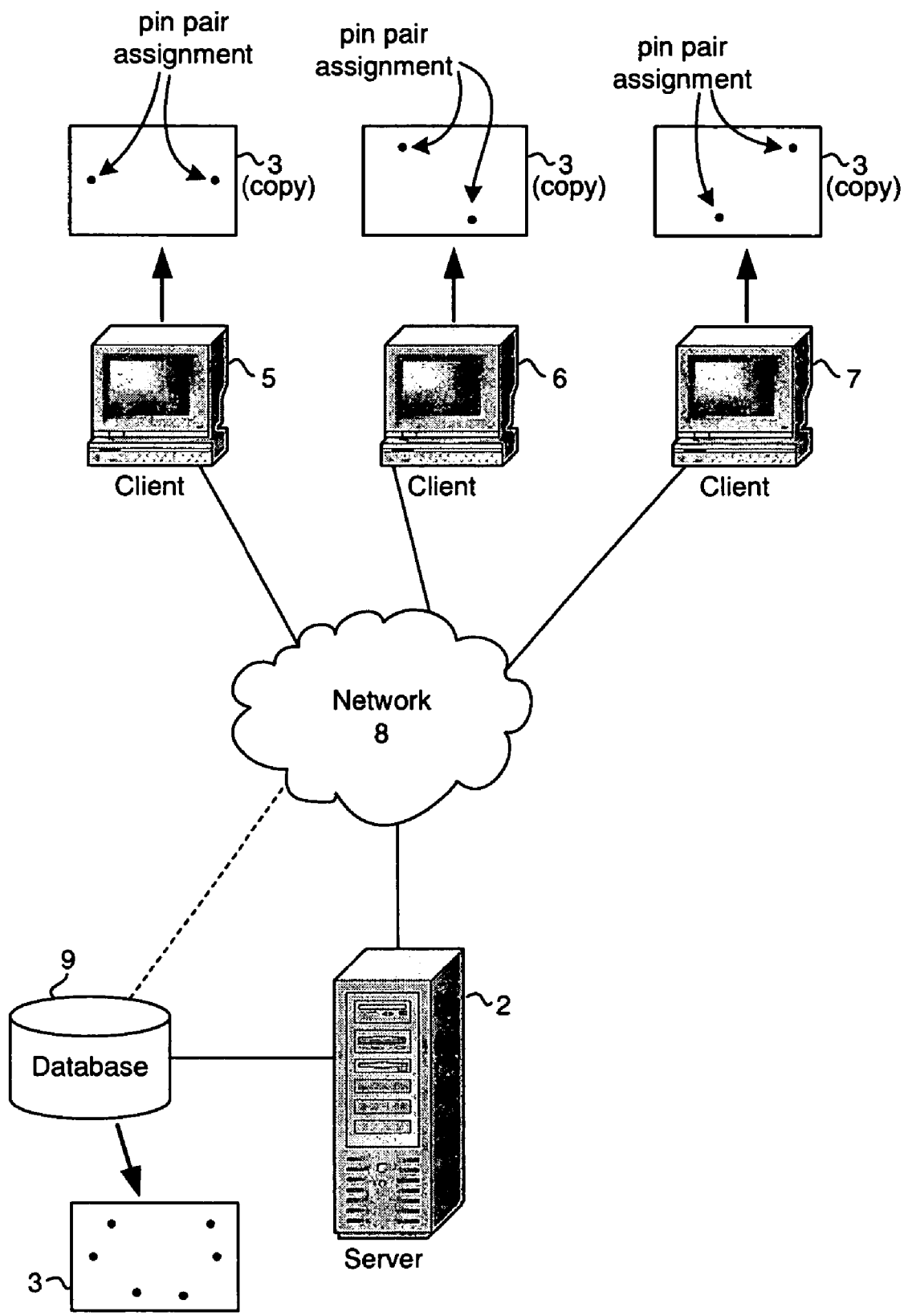
FIG. 1 is a block diagram of a computing system upon which at least some aspects of the invention may be implemented.

FIG. 1 is a block diagram showing one example of the invention as implemented in a networked computing system. Server 2 maintains a master PCB design 3 and communicates pin pair assignments to multiple client computers 5, 6 and 7 over a network 8. Clients 5, 6 and 7 each maintains a copy of PCB design 3. As explained in more detail below, however, the copies of PCB design 3 maintained by each client may not be identical, and may not reflect all changes server 2 has incorporated into PCB design 3. Although only three clients are shown, many other client computers could be similarly networked with server 2. Operating on each of clients 5, 6 and 7 is an application program which routes connections between pins of PCB components. The autorouting software on clients 5, 6 and 7 can be any of various autorouting programs known in the art (e.g., the AUTOACTIVE place and route editing environment or the BLAZEROUTER autorouting software available from Mentor Graphics Corporation of Wilsonville, Oreg.) modified to operate in conjunction with server 2. In particular, and as described in more detail below, server 2 assigns pin pairs to each client for routing connections between those pin pairs, and further instructs the clients whether the routed connections are accepted or rejected. Based on instructions from server 2, clients 5, 6 and 7 thus use known routing algorithms to route portions of PCB design 3. In some embodiments, clients 5, 6 and 7 do not all have the same autorouting software.

Server 2 accesses PCB design 3 from a database 9. Database 9 may be part of server 2 (e.g., a hard drive of server 2), may be located near server 2, or may be located remote from server 2. Indeed, database 9 may be physically located at one of clients 5, 6 or 7. Server 2 and clients 5, 6 and 7 are conventional computers. Each has, e.g., one or more processors, non-volatile storage (e.g., a hard disk drive), volatile memory (e.g., RAM) and other elements well-known in the art. Server 2 and clients 5, 6 and 7 may employ any of a variety of operating system software. The details of inter-computer networking are similarly known in the art and thus not described herein. Notably, server 2 need not have more processing capacity than client 5, 6 or 7.

Figure 2:
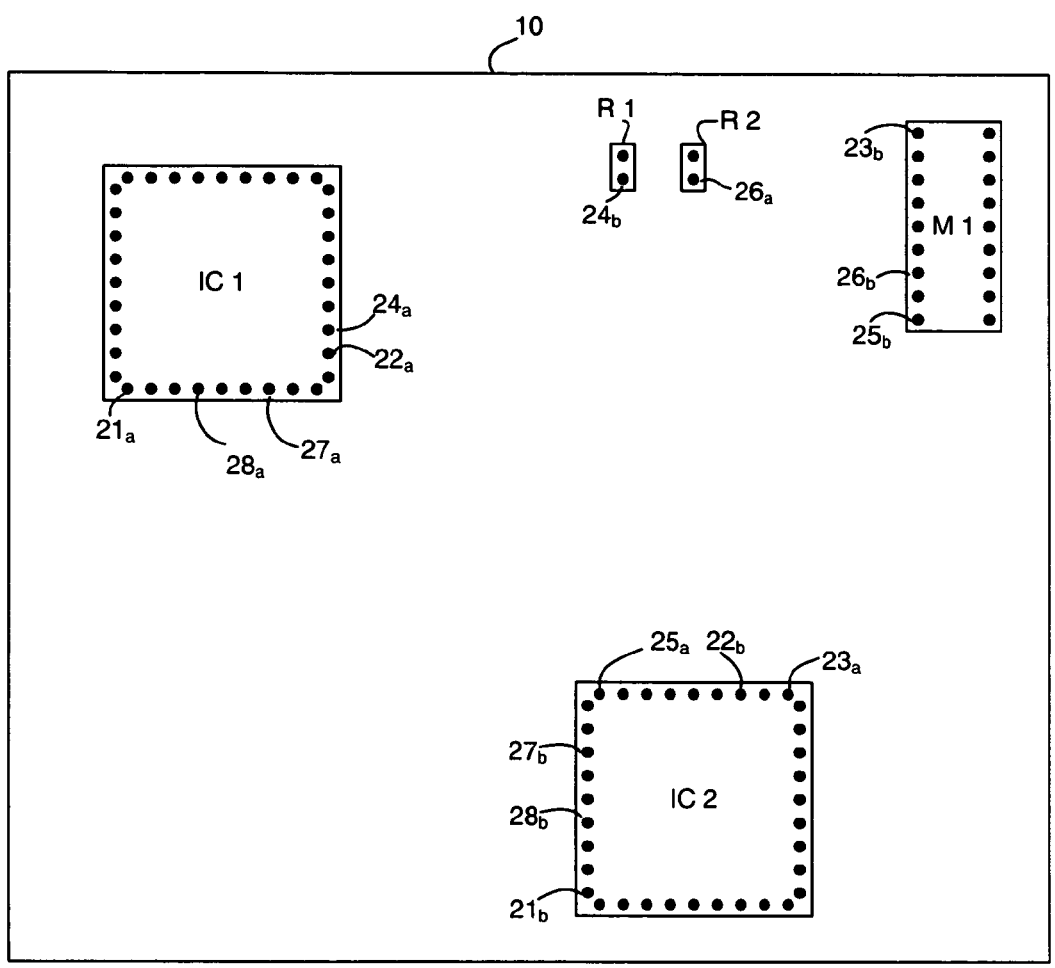
FIG. 2 is a block diagram of a portion of a PCB design.

FIG. 2 is a block diagram of a portion of PCB design 3 which will be used to further illustrate embodiments of the invention. As shown in FIG. 2, locations for various electronic components have been mapped onto a board 10 (or "placed"). For example, the locations of integrated circuits IC1 and IC2 are shown as large squares. Locations for memory chip M1 is shown as a large rectangle. Resistors R1 and R2 are shown as smaller rectangles. Each component in FIG. 2 has two or more pins (shown as large dots) to which one or more conductive traces is to be connected. Several of these pins are labeled ($21_a$, $21_b$, etc.) so as to correspond to subsequent drawing figures. The PCB of FIG. 2 is a dual-sided board. In other words, the PCB will have traces formed on both sides of the board; traces on opposing sides are then connected using a "via" (i.e., a hole drilled into the board to connect the traces, which hole is then filled with conductive material). Traces on the reverse side of the board will be oriented vertically in the drawings and shown in subsequent figures with dashed lines. Traces on the front side of the board will be oriented horizontally and shown with solid lines. As previously indicated, PCB design 3 only includes a portion of a circuit for which a PCB design is being generated. This is to simplify description of embodiments of the invention. In practice, a complete circuit is often much more complex, and may have hundreds of components and hundreds or thousands of pins. The components shown in FIG. 2 are merely examples, and the invention is not limited by the number, type or arrangement of components. Similarly, the invention is also applicable to PCBs having traces on a single side, as well as PCBs having more than two layers of traces.

As previously described, a netlist is generated for the circuit being put onto on the PCB. This list, which may be developed from the circuit schematic or in another manner, identifies each pair of pins which must be connected. FIG. 3 shows a portion of a netlist 11 corresponding to the PCB design 3 of FIG. 2. As indicated in FIG. 3, pin $21_a$ (located on IC1) must be connected to pin $21_b$ (located on IC2). Similarly, pins $22_a$ and $22_b$ (also respectively located on IC1 and IC2) are to be connected, as are pins $23_a$ and $23_b$ (respectively located on IC2 and M1).

Figure 4:
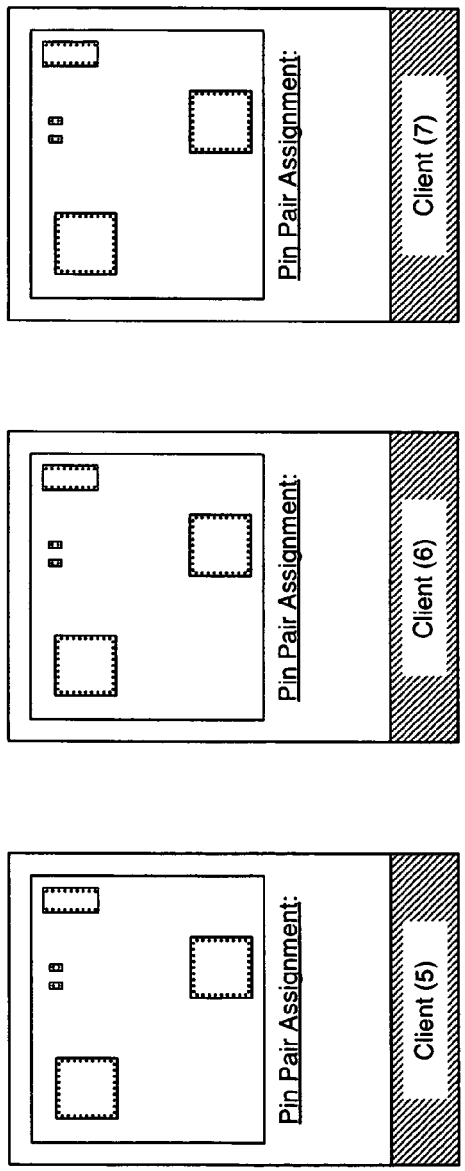
FIG. 4 illustrates, in diagrammatic form, the beginning of a distributed autorouting session according to at least some embodiments of the invention.
Figure 4:
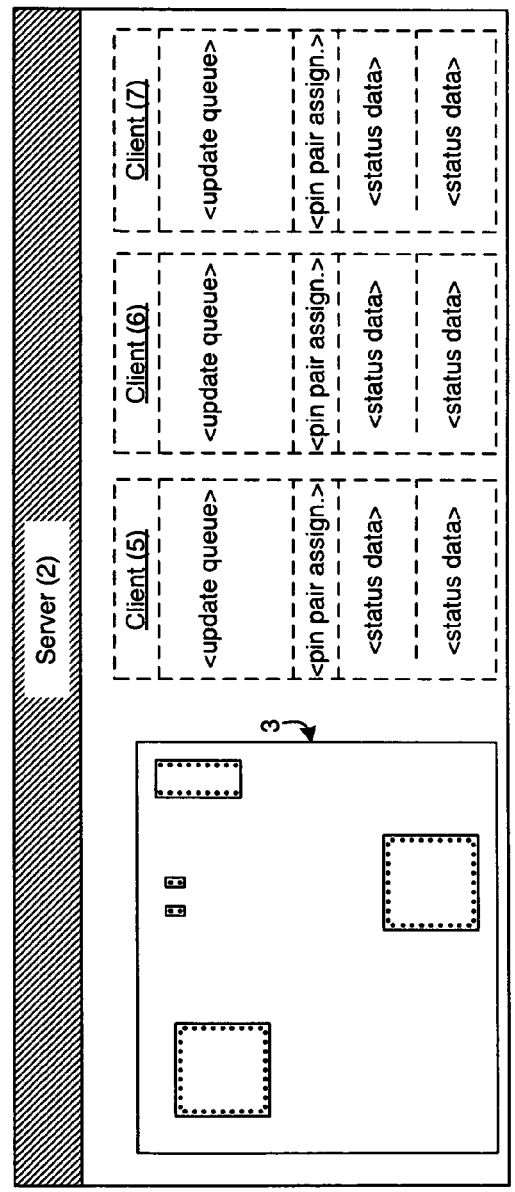

FIG. 4 illustrates, in diagrammatic form, the beginning of a distributed autorouting session according to at least some embodiments of the invention. As shown in FIG. 4, server 2 maintains the master PCB design 3. Design 3 includes the location of all components, as well as all routed connections which server 2 has incorporated into design 3. Because FIG. 4 corresponds to the beginning of an autorouting session, server 2 has not yet incorporated any routed pin connections into design 3. Server 2 further maintains information for the client computers participating in the autorouting session. For each client, server 2 tracks any pending design updates ("update queue") not yet provided to that client. Server 2 further tracks the current pin pair assigned to each client for autorouting ("pin pair"), as well as various other information about the status of each client's progress with its assigned autorouting task. In the example of FIGS. 4–12, only three clients (5, 6 and 7) are shown, but fewer or more clients could be included.

Figure 5:
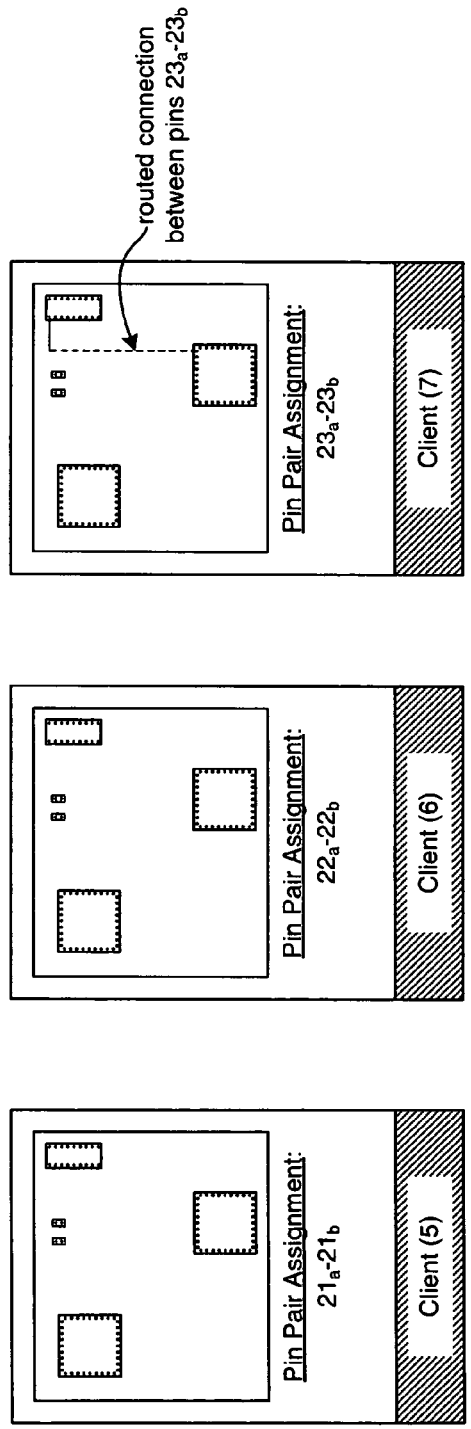
FIGS. 5–9 show later times in the autorouting session of FIG. 4.
Figure 5:
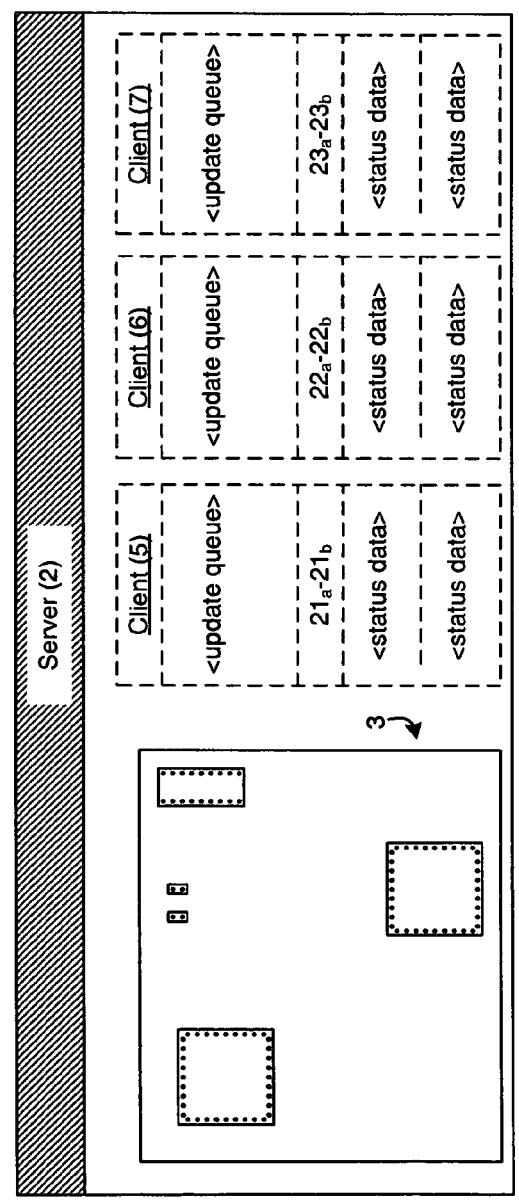
Figure 6:
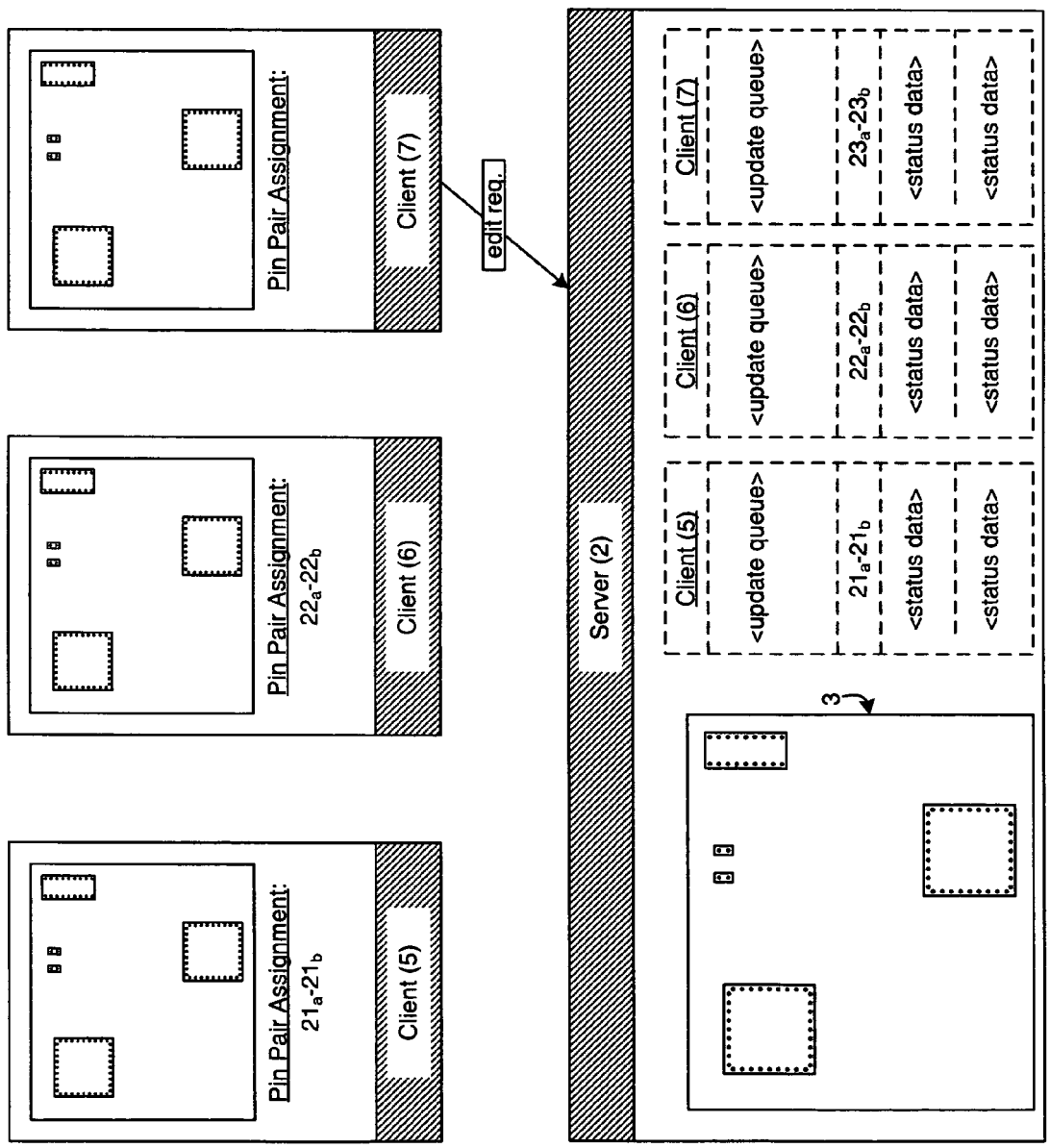

FIG. 5 shows a later time in the autorouting session of FIG. 4. In particular, server 2 has initially assigned a pin pair to each client computer for routing. Specifically, server 2 has assigned pin pair $21_a$–$21_b$ to client 5, pin pair $22_a$–$22_b$ to client 6 and pin pair $23_a$–$23_b$ to client 7. Client 7 has routed a connection between pins $23_a$ and $23_b$. As shown in FIG. 6, client 7 then forwards an edit request to server 2. The forwarded edit request contains the route between pins $23_a$ and $23_b$ found by client 7. After forwarding the edit request to server 2, client 7 returns its copy of the PCB design to the condition prior to routing pins $23_a$–$23_b$, and awaits further instructions from server 2.

Figure 7:
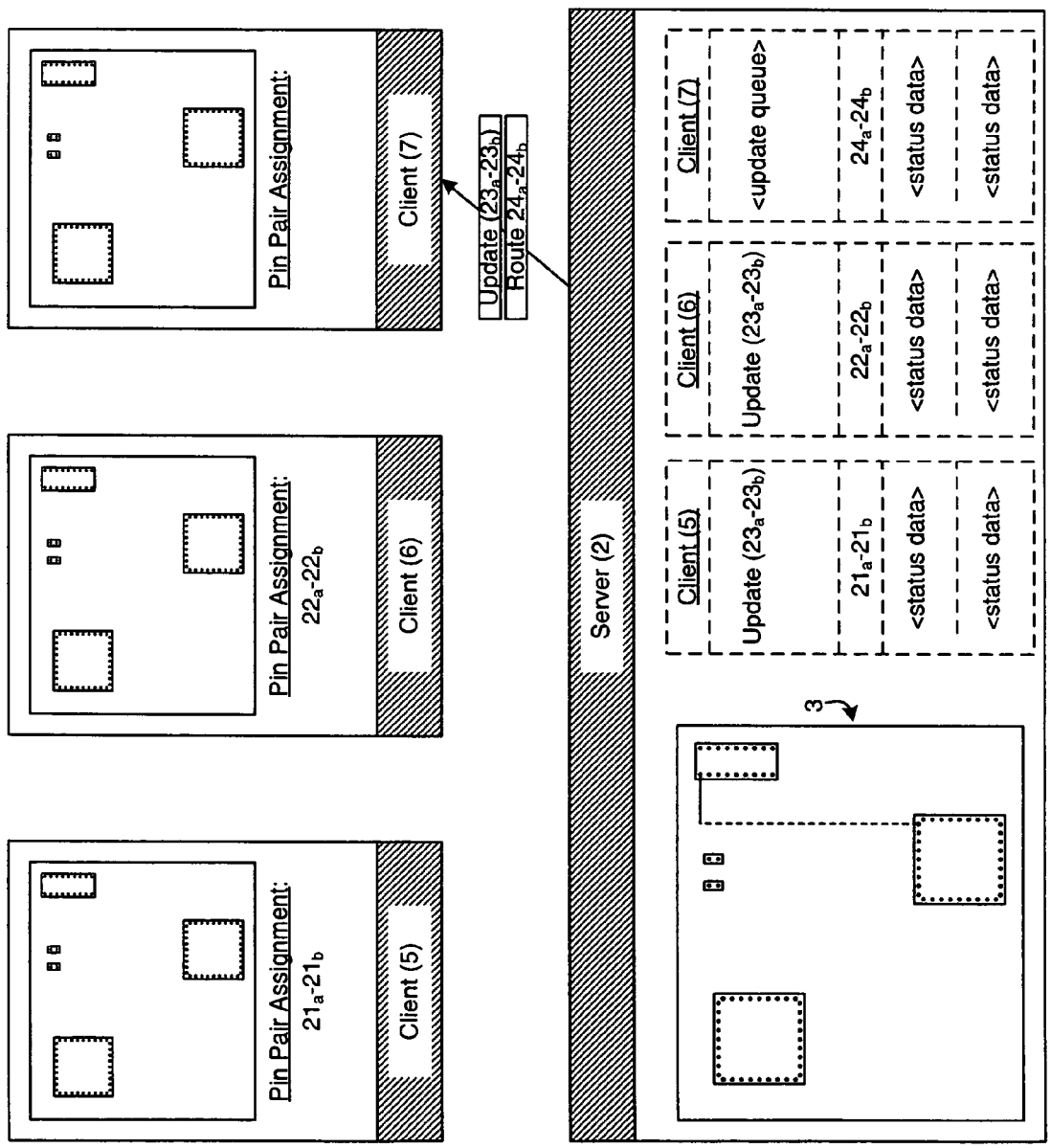

In FIG. 7, server 2 has received the edit request from client 7, and has performed a design rule check (DRC) on the route which client 7 seeks to add to design 3. In particular, server 2 determines whether the proposed route conflicts with another route previously added to design 3 or otherwise violates a rule established for the PCB design. For example, a rule may require that traces on the PCB be separated by a minimum distance so as to minimize the potential for shorts caused by manufacturing defects. After the proposed route contained in the edit request from client 7 passes the DRC, server 2 applies the edit to design 3. Server 2 then assigns a new pin pair to client 7 for routing, and prepares an update message for all clients to update their copies of design 3 to reflect the new route between pins $23_a$ and $23_b$.

Server 22 places the update message in the update queue for each client. In at least some embodiments, server 2 does not send updates to a client until that client is idle. For example, client 7 is waiting for server 2 to forward a new pin pair assignment. When server 2 forwards a new pin pair assignment to client 7, server 2 also forwards an update instructing client 7 to now include the proposed $23_a$–$23_b$ route in the client 7 copy of design 3. In this manner, client 7 is able to take that newly-included route into consideration during its new routing task. If server 2 had rejected the proposed $23_a$–$23_b$ route, and if updates had been generated between the time of the initial assignment of pin pair $23_a$–$23_b$ to client 7 and the time of reporting the rejection, server 2 would send those interim updates to client 7 with a message advising that the proposed $23_a$–$23_b$ route was rejected, and instructing client 7 to try again. For example, client 5 or client 6 may have completed its routing task before client 7, and generated a route conflicting with the route proposed by client 7.

Figure 8:
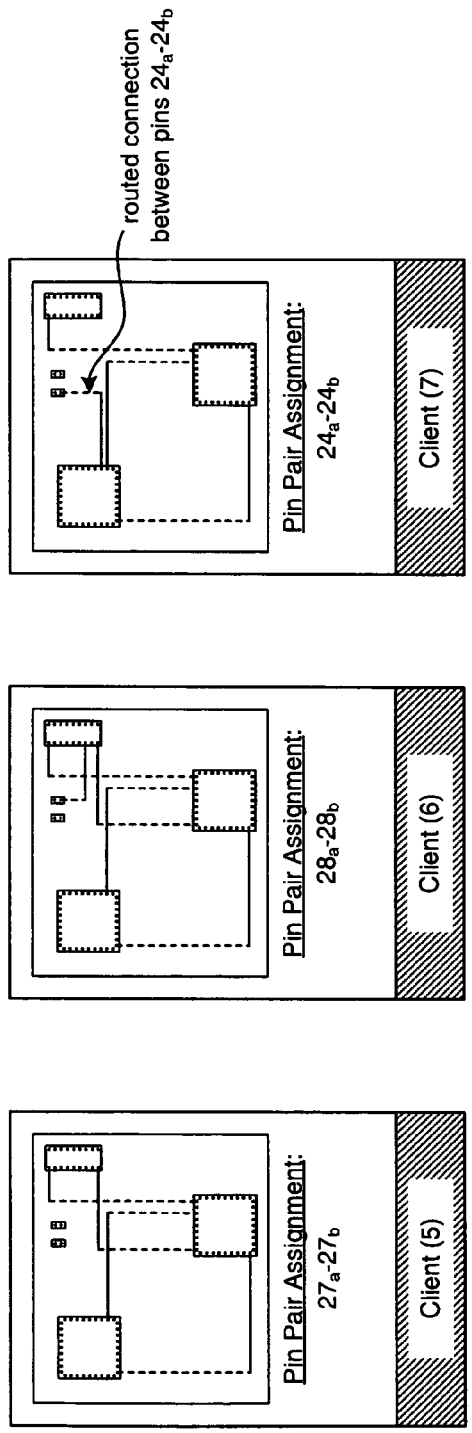
Figure 8:
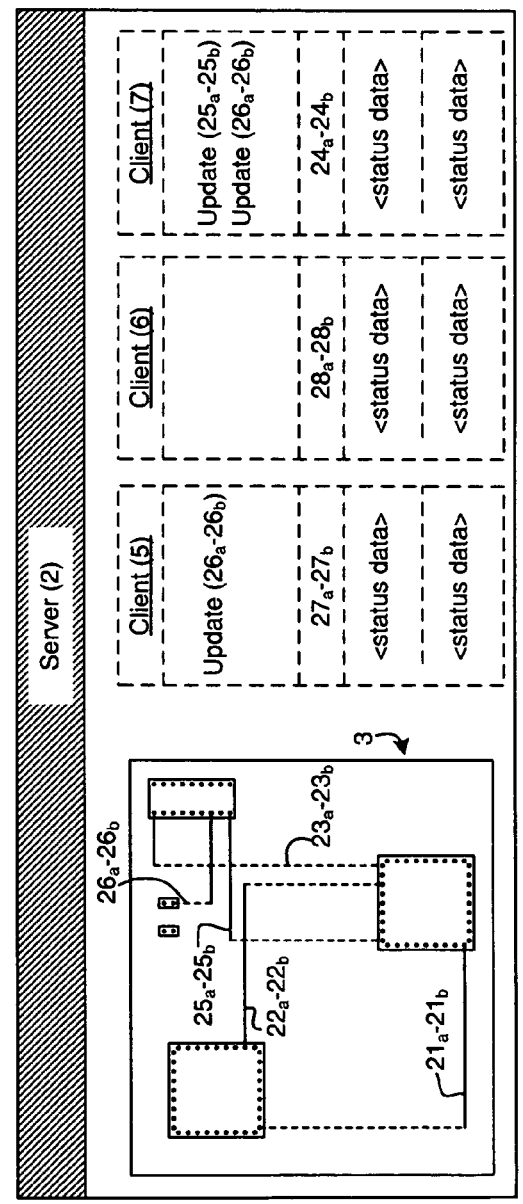

FIG. 8 shows a still later time during the autorouting session begun in FIG. 4. At this point, server 2 has incorporated into design 3 routes for pin pairs $21_a$–$21_b$, $22_a$–$22_b$, $23_a$–$23_b$, $25_a$–$25_b$ and $26_a$–$26_b$. Client 7 has just routed a connection between pin pair $24_a$–$24_b$, while clients 5 and 6 are respectively attempting to route pin pairs $27_a$–$27_b$ and $28_a$–$28_b$. Since the time server 2 assigned pin pair $24_a$–$24_b$ to client 7, client 5 sent an edit request to server 2 proposing a route for connecting pin pair $25_a$–$25_b$, and server 2 accepted that route. During that same interval, client 6 sent an edit request to server 2 proposing a route for connecting pin pair $26_a$–$26_b$, and server 2 also accepted that route. When server 2 accepted the route for pin pair $25_a$–$25_b$, server 2 prepared an update request and placed it in the update queue for each client. That update was sent to client 5 with a new pin pair assignment ($27_a$–$27_b$), but was not sent to client 6 or 7 because each was busy with a routing assignment. When server 2 later accepted a route for pin pair $26_a$–$26_b$ proposed by client 6, server 2 prepared another update request for that route and placed it in the update queue for each client. Because client 5 was then busy routing pin pair $27_a$–$27_b$, and client 7 was still busy routing pin pair $24_a$–$24_b$, the updates were not sent to clients 5 or 7. However, the updates for the routes for pin pairs $25_a$–$25_b$ and $26_a$–$26_b$ were sent to client 6 with a new pin pair assignment ($28_a$–$28_b$). Thus, at the time client 7 finds a route for pin pair $24_a$–$24_b$, client 7 has 2 updates in its update queue, client 5 has one update in its update queue and client 6 has no updates in its update queue. Similarly, client 7 has routed pin pair $24_a$–$24_b$ without knowledge of the routes for pin pairs $25_a$–$25_b$ and $26_a$–$26_b$ that have been incorporated into design 3.

Figure 9:
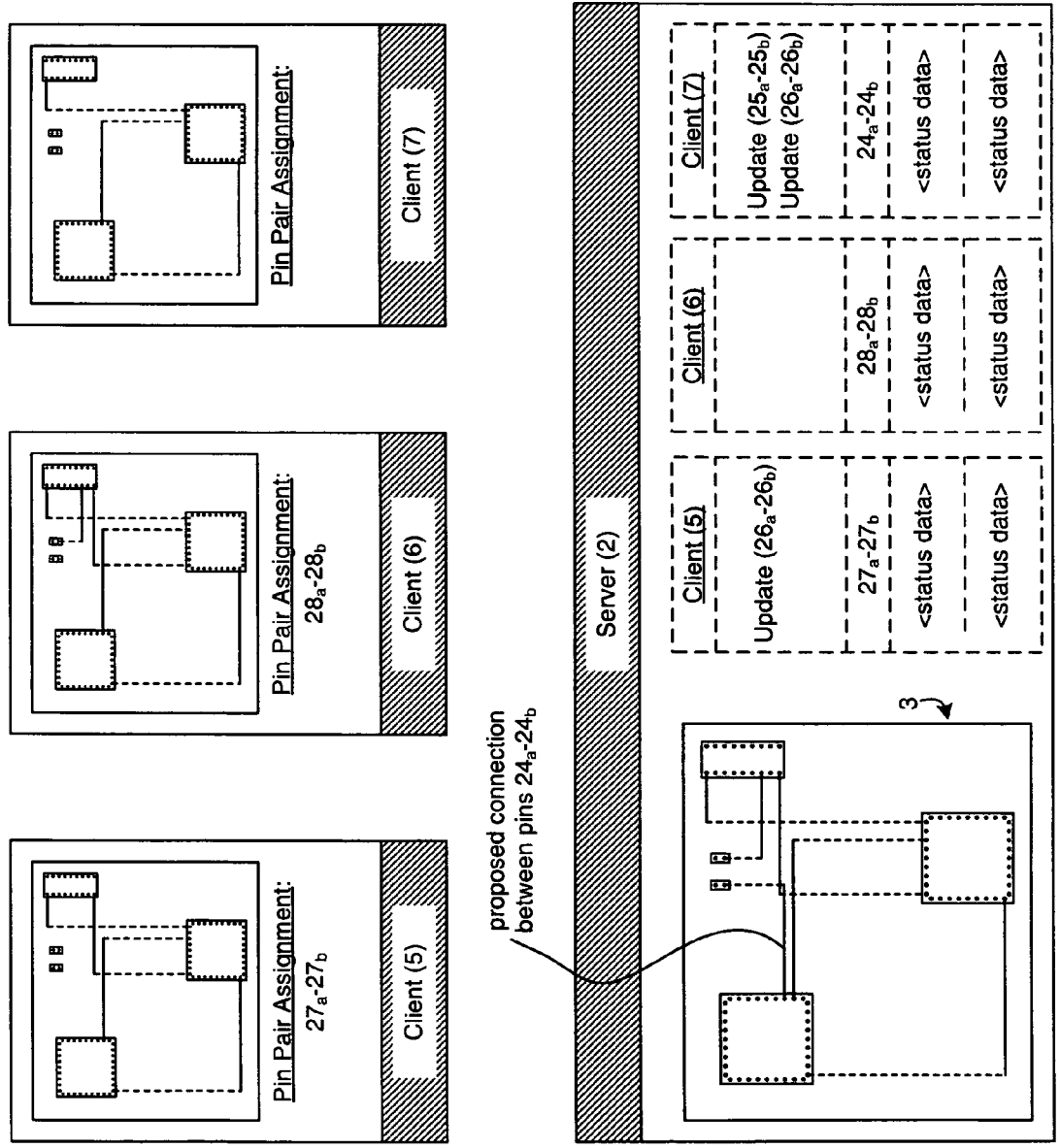
Figure 10:
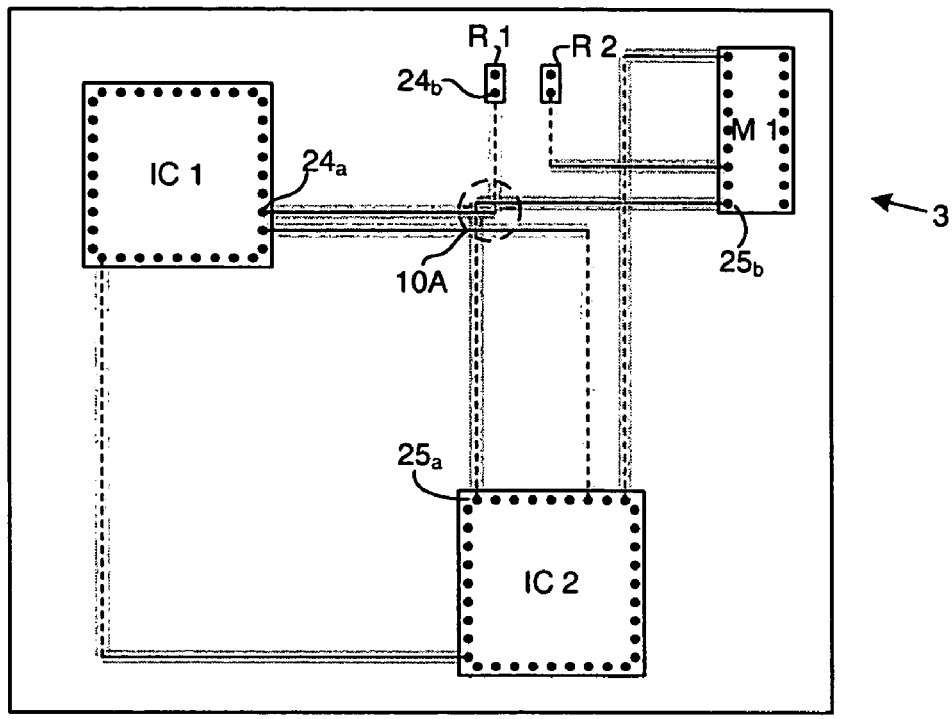
FIGS. 10 and 10A shows a design rule violation for a proposed pin connection route.
Figure 10A:
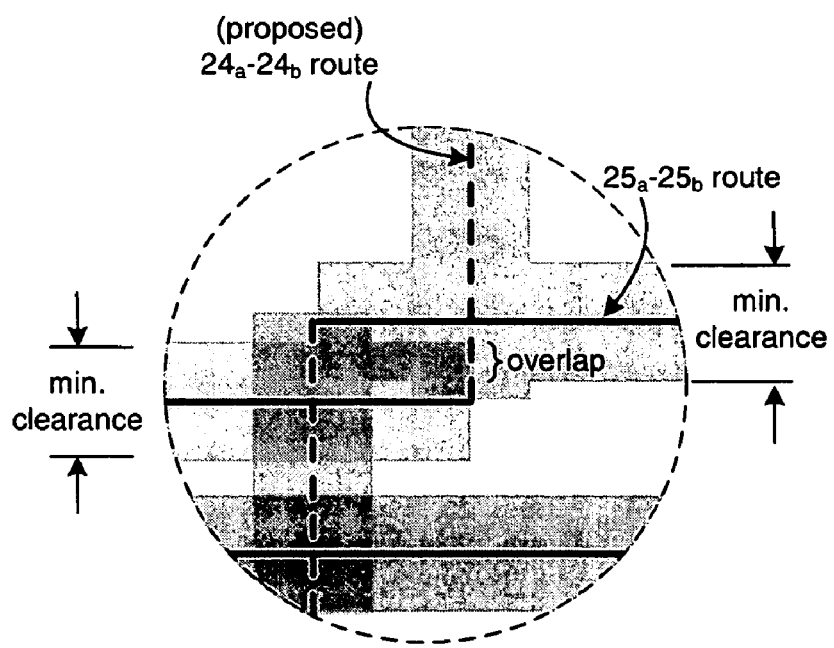
Figure 11:
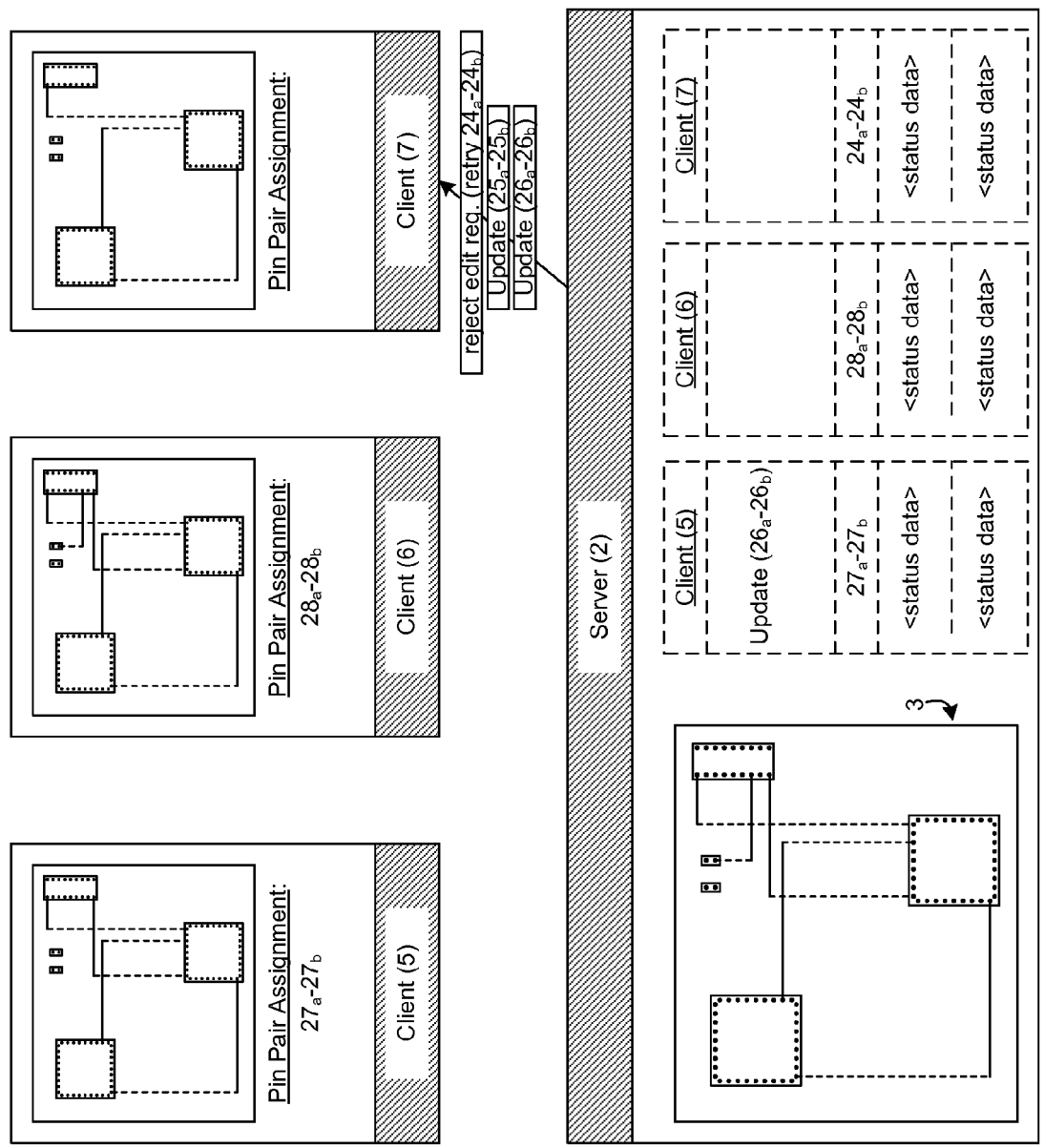
FIGS. 11 and 12 show additional later times in the autorouting session of FIG. 4.
Figure 12:
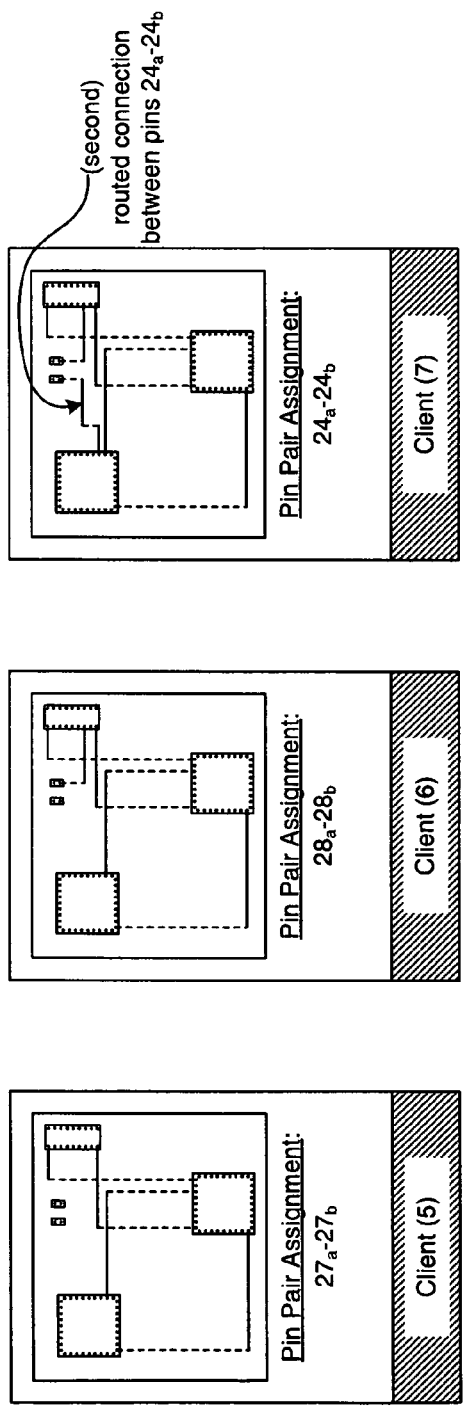
Figure 12:
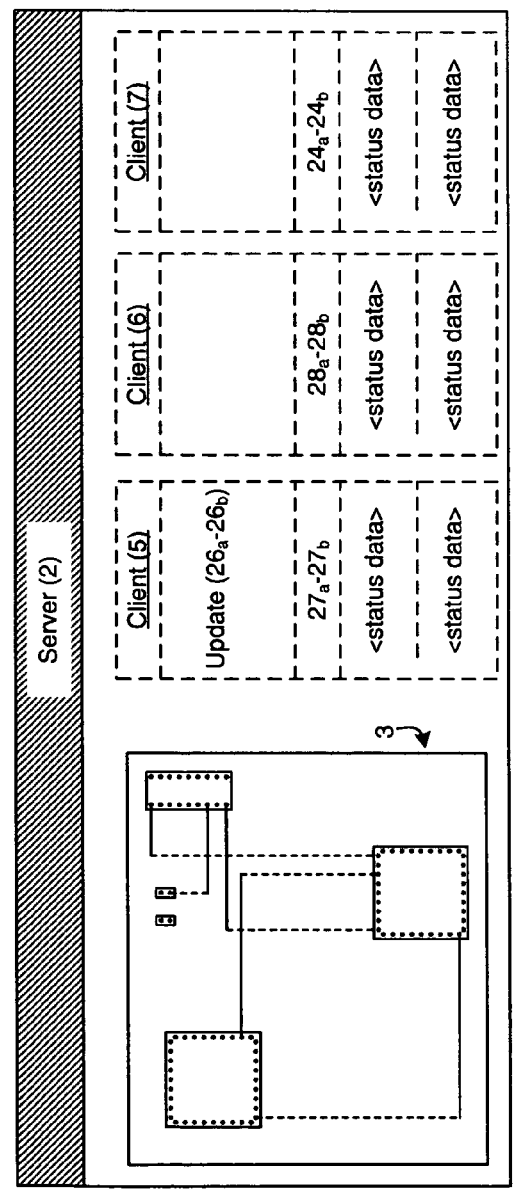

In FIG. 9, client 7 has forwarded an update request for a proposed $24_a$–$24_b$ connection route. When server 2 performs a DRC for the proposed route connecting pin pair $24_a$–$24_b$, server 2 finds a rule violation. In particular, and as shown in more detail in FIGS. 10 and 10A, the proposed $24_a$–$24_b$ route is too close to the route for pins $25_a$–$25_b$. In FIG. 10, the traces are shown as solid or dashed lines. The minimum clearance between traces is represented as a shaded region around each trace. If the shaded regions of two traces on the same side of the board overlap (or on the same level for boards with more than two levels), the traces are too close. As seen in FIG. 10, and as shown in more detail in the enlargement of FIG. 10A, a horizontal part of the clearance zone for the proposed $24_a$–$24_b$ route overlaps a horizontal part of the clearance zone for the previously-incorporated $25_a$–$25_b$ route. Accordingly, server 2 rejects the proposed route for connecting pins $24_a$–$24_b$. Server 2 then sends a rejection message to client 7, together with the updates (for pin pairs $25_a$–$25_b$ and $26_a$–$26_b$) in the update queue of client 7 (FIG. 11). Subsequently, client 7 finds a new route (FIG. 12). Notably, the new route requires an additional via, as the new route has two horizontal sections and two vertical sections. Although not shown in FIG. 12, client 7 would then forward a subsequent edit request for the second route.

The process shown in FIGS. 4–9 continues until all pin pairs are routed, or until some other stop condition is reached. For example, one or more clients may report that certain pin pairs cannot be routed based on current design rules and previously-incorporated routes. In some cases, the unroutability of a connection may be based on a client not routing the connection within a specified time period. Depending on the number of unroutable connections, a designer may manually route those connections by making adjustments to the design rules and/or previous routes. If the number of unroutable connections is sufficiently large or the problem is not resolvable by adjusting other routes and/or the design rules, one or more components may need to be moved, and the routing process repeated.

In other embodiments of the invention, server 2 performs several passes through the netlist. In the first pass, server 2 requires clients 5, 6 and 7 to route pin pair connections without using a via. Server 2 goes through all pin pairs in the net list (or goes through all pairs which can possibly be routed without a via, as described below) during the first pass. For each pin pair, server 2 either obtains a connection route from one of the clients, or an indication that the connection cannot be routed without using a via. If a connection for a particular pin pair cannot be routed without using a via, routing of that pin pair is deferred until the next pass through the netlist. In the second pass through the netlist, server 2 requires the clients to route connections using only a single via. Server 2 again goes through all pin pairs in the net list (or goes through all pairs which can possibly be routed with only one via, as described below), and obtains either a route or an indication of unroutability for each pair from one of the clients. Pin pair connections which cannot be routed using only a single via are again deferred until the next pass. In the third pass, server 2 allows clients to route connections using two vias. Server 2 again goes through all pin pairs in the net list (or goes through all pairs which can possibly be routed with only two vias), obtains either a route or an indication of unroutability from one of the clients for each pair, and defers unroutable connections until the next pass. Server 2 continues to make passes for additional numbers of vias until all connections are routed, or until some other stop condition is reached.

Figure 13:
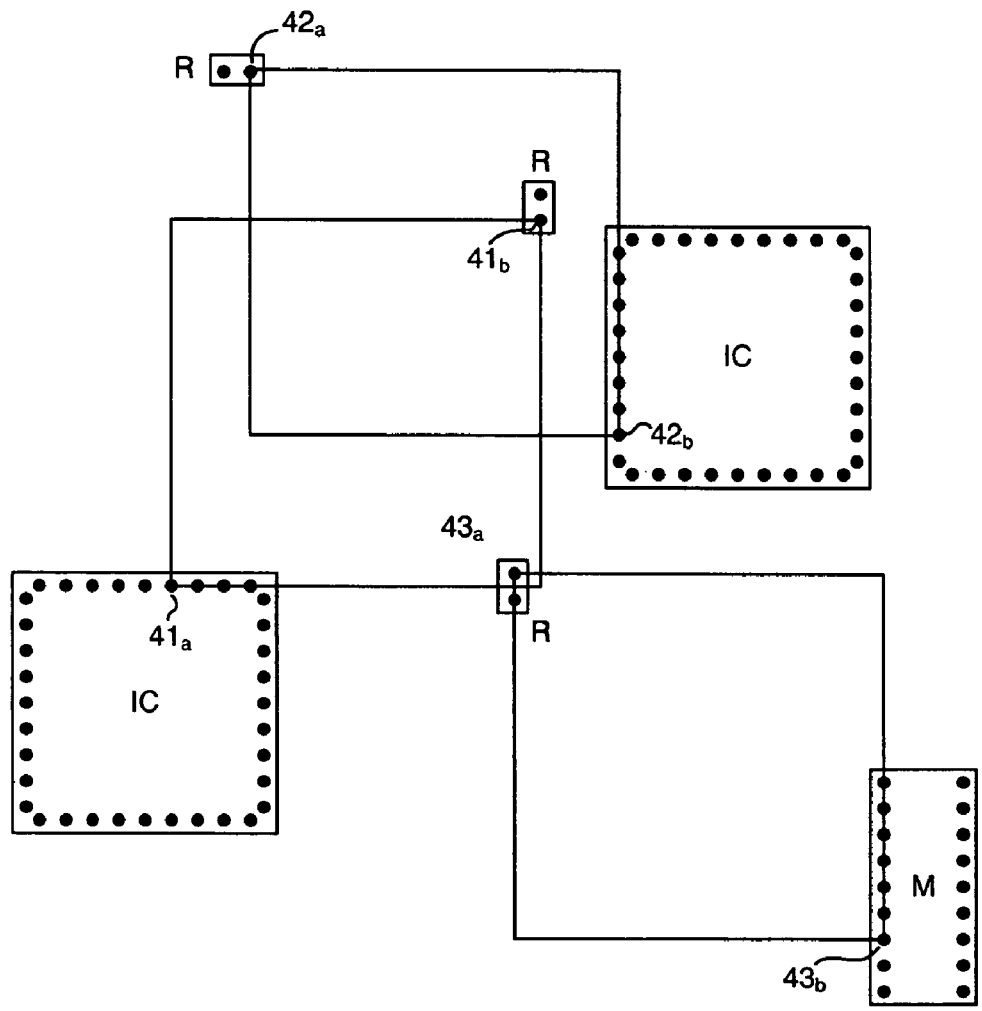
FIG. 13 illustrates classification of pin pairs according to relative location.

Within each pass, server 2 assigns pin pairs on several bases. First, server 2 assigns pin pairs requiring longer connections before assigning pin pairs requiring shorter connections. In other words, server 2 sorts pin pairs based on distance between the pins within each pair, and assigns pin pairs in descending order of distance. In some embodiments, server 2 further sorts pin pairs based on the relative locations of the pin pairs. In particular, as to several groups of pin pairs having the same general separation distance, server 2 assigns pin pairs which overlap the least. This is illustrated in FIG. 13, which shows two integrated circuits (IC), a memory chip (M) and three resistors (R) having pins to be connected. Included in the netlist for the circuit of FIG. 13 are requirements to connect pins $41_a$ and $41_b$, pins $42_a$ and $42_b$ and pins $43_a$ and $43_b$. The distance between pins $41_a$ and $41_b$ equals the distance between pins $42_a$ and $42_b$, and also equals the distance between pins $43_a$ and $43_b$. For each of these pin pairs in FIG. 13, a rectangle is drawn such that the pins of the pair are located at diagonal vertices. The $43_a$–$43_b$ rectangle slightly overlaps the $41_a$–$41_b$ rectangle. The $42_a$–$42_b$ rectangle overlaps the $41_a$–$41_b$ rectangle to a larger degree. Because the $43_a$–$43_b$ rectangle has less overlap with the $41_a$–$41_b$ rectangle, there is less likelihood that simultaneously-routed connections for pins $41_a$–$41_b$ and pins $43_a$–$43_b$ will conflict. Conversely, there is more likelihood that simultaneously-routed connections for pins $41_a$–$41_b$ and pins $42_a$–$42_b$ will conflict. Accordingly, server 2 assigns pins $41_a$–$41_b$ to one client and $43_a$–$43_b$ to another client, and avoids assigning pins $42_a$–$42_b$ while pins $41_a$–$41_b$ are being routed.

Figure 14:
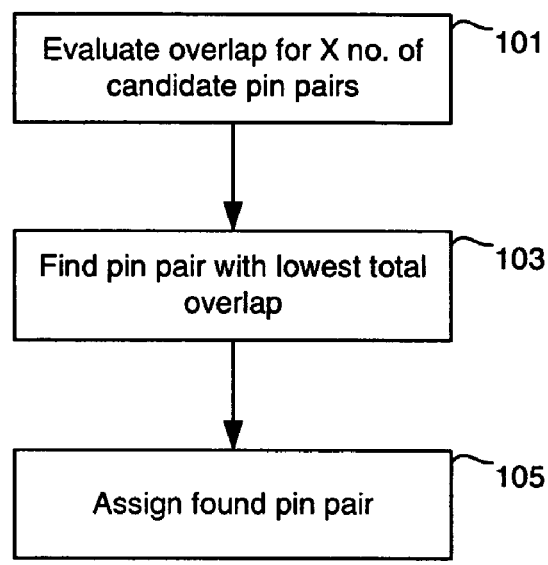
FIG. 14 is a flow chart showing, according to at least some embodiments, an algorithm for checking the amount of overlap between pin pairs.

In practice, there may not be multiple pin pairs having precisely the same separation distance as in FIG. 13. However, after sorting pin pairs based on separation, server 2 is configured in some embodiments to check the amount of overlap between pins pairs in a certain range on a list of pairs ranked by distance. FIG. 14 is a flow chart showing one example of how server 2 performs this check (using the netlist of FIG. 15) in at least some embodiments. The netlist of FIG. 15 lists pin pairs in descending order of separation distance. In other words, the pins of pin pair n−4 are farther apart than the pins of pair n−3, which are in turn farther apart than the pins of pair n−2, etc. In FIGS. 14 and 15, the server has previously assigned pin pair n and pin pair n−2 to respective first and second clients, and is now assigning a pin pair to a third client. The server has not yet assigned pin pairs n−4, n−3 or n−1. When making previous pin pair assignments, the rectangles drawn for those pin pairs overlapped the rectangles for already-assigned pin pairs more than rectangles for other pin pairs. Beginning at block 101 (FIG. 14), the server evaluates overlap between the currently assigned pin pair rectangles and a number of candidate pin pairs. In particular, the server computes the amount by which rectangles for each of pin pairs n−4, n−3 and n−1 overlap the rectangle for pin pair n and the rectangle for pin pair n−2. The server then performs the same calculations for pin pairs n+1, n+2, n+3, etc., until the server has performed the calculations for X number of candidate pin pairs. The value of X can be a preset value, or can vary based on other conditions during an autorouting session. After calculating overlap for the candidate pin pairs, the server determines at block 103 which of the candidate pin pairs has the lowest total overlap with the currently assigned pin pairs. Specifically, the server adds the amount by which each candidate pin pair overlaps pin pair n to the amount by which the same candidate pin pair overlaps pin pair n−2. At block 105, the pin pair with the lowest combined overlap is assigned to the third client.

Numerous variations upon the algorithm of FIG. 14 are used in other embodiments. For example, instead of simply assigning the pin pair with the lowest combined overlap of currently assigned pin pairs, the server could further require that a pin pair not overlap any currently assigned pin pair by more than a certain amount. In other embodiments, pin pairs which have been previously passed over (such as n−4, n−3 and n−1) are given priority, and/or are automatically chosen upon being passed over more than a certain number of times. Numerous other variations are within the scope of the invention.

Figure 16:
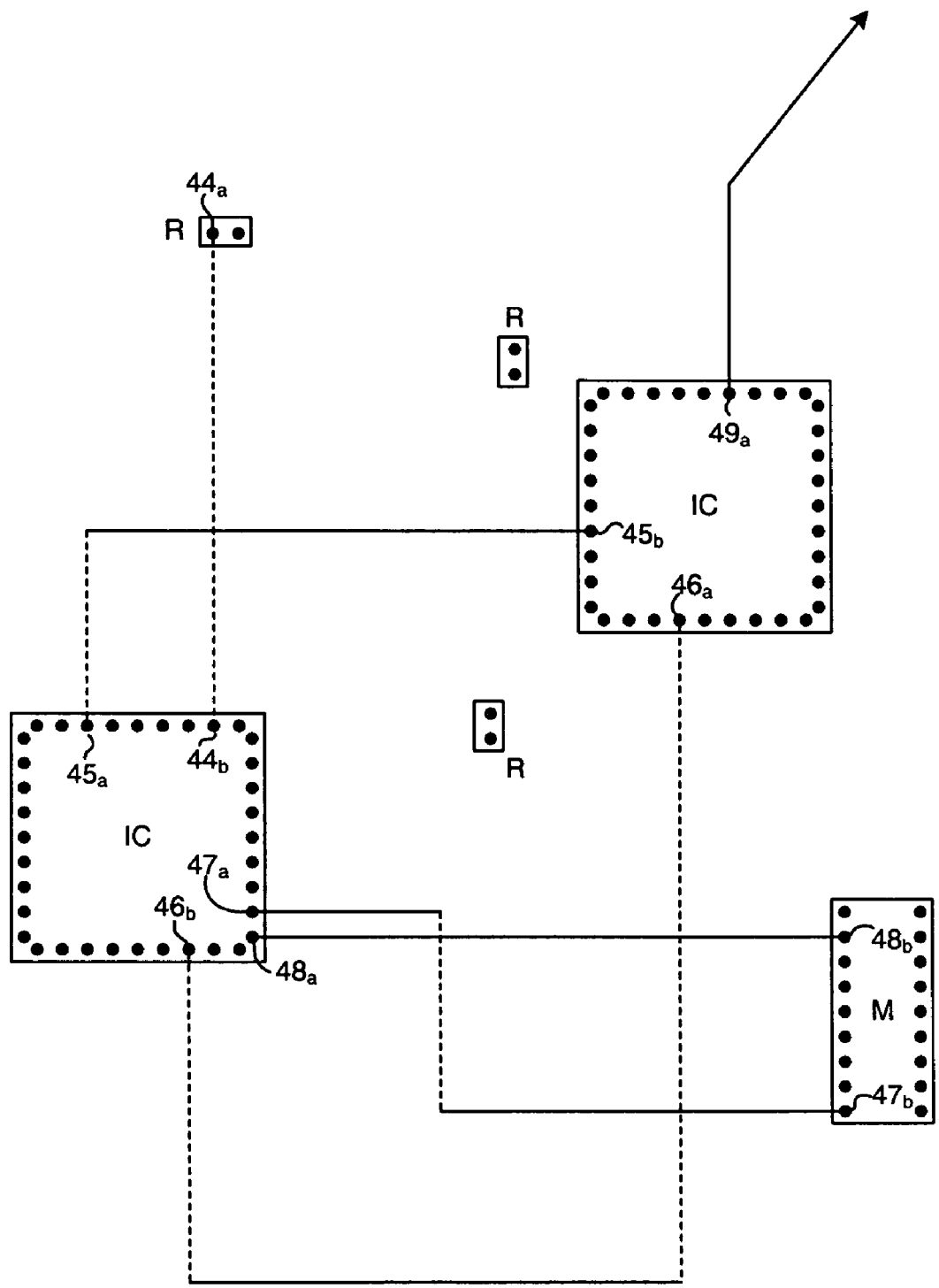
FIG. 16 illustrates classification of pin pairs according to minimum number of vias.

In some embodiments, server 2 also determines, prior to making a pass through the netlist requiring routing using a certain number of vias, which pin pairs cannot meet that via limitation. As seen in FIG. 16 (which reproduces the circuit components of FIG. 13), some pin pairs (e.g., pins $44_a$–$44_b$ and $48_a$–$48_b$) are potentially connectable by a route having a no turns. If those pins can be connected with a no-turn route, no via would be needed. Accordingly, these pin pairs can be assigned for routing during the first pass. Other pin pairs (e.g., pins $45_a$–$45_b$) will require a route having at least one turn, and thus at least one via. Because these pin pairs would be unroutable by a client constrained to route using no vias, these pin pairs are deferred until the second pass. Some pin pairs (e.g., pins $46_a$–$46_b$ and $47_a$–$47_b$) will require routes having at least two turns, and thus at least two vias, and would thus be automatically deferred until the third pass. In more complex designs, there may be pin pairs whose routes will have an even larger minimum number of turns.

In other embodiments, connections between pin pairs may be permitted to change direction on a single layer of the PCB. In other words, and as shown by the trace extending from pin $49_a$, some traces might be permitted to turn without connecting to a trace on another level, and thus without using a via. In these embodiments, such traces can be identified in advance (e.g., allowing such traces for certain pins, for components located in certain regions) and included in the appropriate pass.

Figure 17:
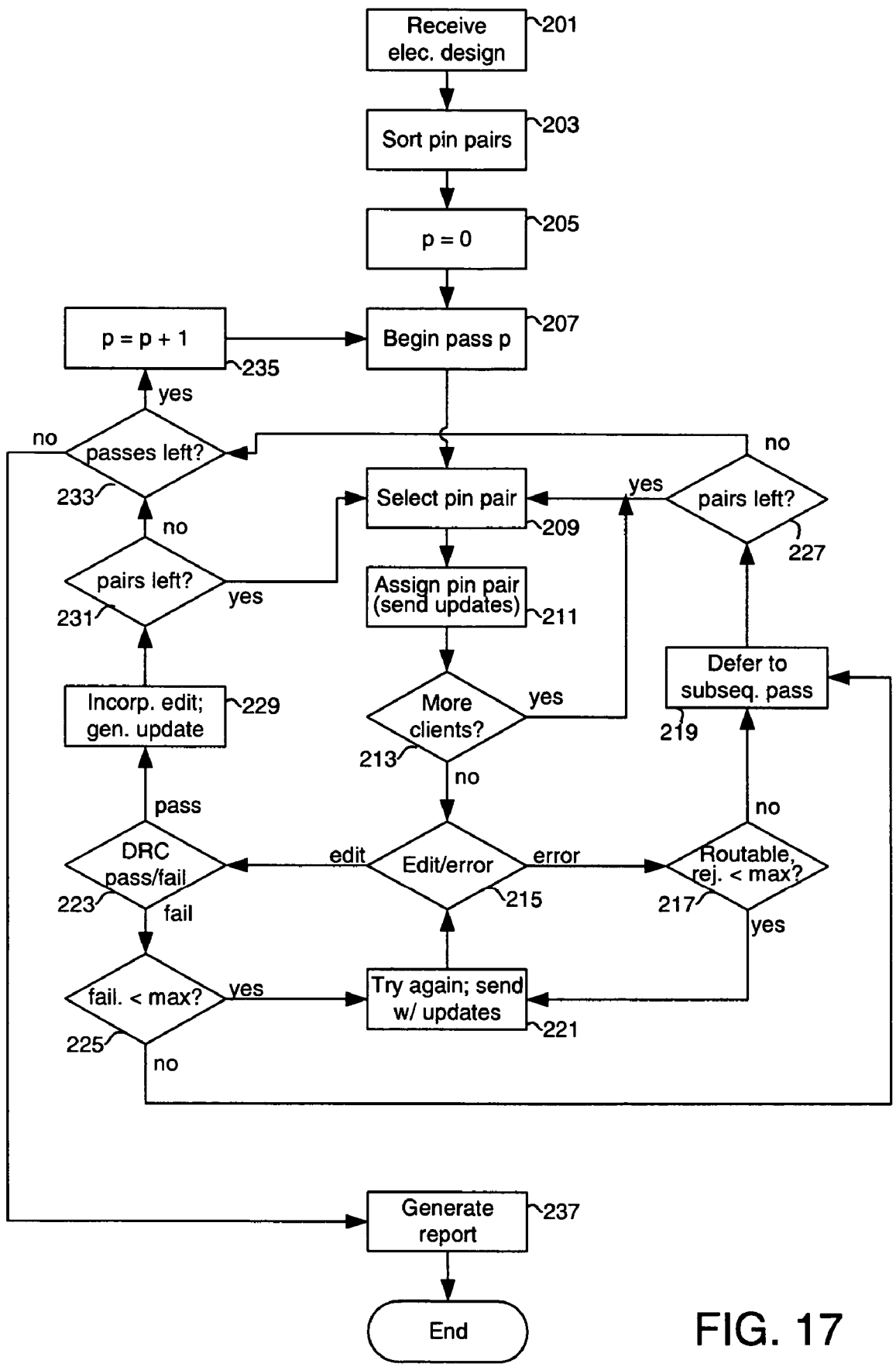
FIG. 17 is a flow chart for a method, according to at least some embodiments of the invention, for controlling a distributed autorouting session from a server.

FIG. 17 is a flow chart for a method, according to at least some embodiments of the invention, for controlling a distributed autorouting session from a server. At block 201, the server receives the electrical design for the circuit to be placed onto a printed circuit board. This electrical design includes a netlist indicating all pin pairs which are to be connected, as well as the placement of components on the PCB. At block 203, the server sorts the pin pairs. In some embodiments, and as described above, the server sorts the pin pairs based on distance between the pins to be connected. The server may also sort on other bases, such as pins which cannot be connected without using a via, without using two vias, etc. At block 205, the server sets a pass counter (p) to 0. At block 207, the server begins pass 0. During this pass, the server will require clients to route connections between pins without using vias. At block 209, the server selects a pin pair for assignment to a client. Initially, the server selects a pin pair by simply taking the first pin pair on the netlist. After the first pin pair is assigned, the server selects subsequent pin pairs based on distance and overlap with previously-assigned pin pairs (as discussed in connection with FIGS. 14 and 15), as well as based upon whether a pin pair can be connected using the current via constraint (e.g., no vias in pass 0, 1 via in pass 1, etc.). At block 211, the server assigns the selected pin pair to the client, and forwards the assigned pin pair with any updates in that client's update queue (there will be no updates initially). At block 213, the server determines whether there are any other clients which have not been assigned a pin pair. If yes, the server returns to block 209 to select a pin pair for the next client, and forwards that assignment at block 211. If at block 213 there are no more clients to which a pin pair must be assigned (the "no" branch), the server proceeds to block 215. At block 215, the server waits for a client to either submit an edit request containing a proposed route for that client's assigned pin pair ("edit"), or to indicate the assigned pin pair cannot be connected ("error").

A client may itself submit an error by indicating that the assigned pin pair cannot be routed using the current via constraint. A client may also submit an error if the client has been attempting to route a connection for more than a certain amount of time. The server may also generate a time-out error for a client. In the event of an error, the server proceeds to block 217. At block 217, the server determines whether the inability to route was because of the current via constraint. If so (the "no" branch, as the pin pair is not currently routable), or if the pin pair has previously generated a maximum number of errors in the current pass (rejections is not less than the maximum), the server proceeds to block 219. At block 219, the pin pair is deferred to a subsequent pass. The server then proceeds to block 227 and determines if there are remaining pin pairs in the current pass. If yes, the server proceeds to block 209 for selection of another pin pair for the client failing to route the deferred pin pair. If no, the server proceeds to block 233, described below.

If the error reported at block 215 was not caused by the via constraint and the pin pair has not been rejected the maximum number of times in the current pass, the server takes the "yes" branch at block 217. For example, after some pin pairs have been routed, a client may route a connection without knowledge of a previously-routed connection. In such cases, it may still be possible to route the connection using the current via limit. Accordingly, at block 221, the server sends any updates in that client's update queue and an instruction to retry routing the current pin pair (i.e., a reassignment of the pin pair). From block 221, the server returns to block 215 to await another edit or error report.

If the server receives an edit request at block 215, the server proceeds to block 223 and performs a design rule check (DRC) upon the proposed route. If the proposed route fails the DRC (the "fail" branch), the server proceeds to block 225. At block 225 the server determines if the pin pair has failed the DRC less than the maximum number of times during the current pass. If so (the "yes" branch), the server proceeds to block 221, where any updates are sent to the client and the client is instructed to try again. If the number of DRC failures for the pin pair during the current pass is not less then the maximum (the "no" branch), the server proceeds to block 219, where the pin pair is deferred to a subsequent pass, and then to block 227.

If a proposed route passes the DRC at block 223 (the "pass" branch), the server incorporates the route into the master PCB design at block 229. The server also generates an update reflecting the newly-incorporated route and puts the update in each client's queue. The server then proceeds to block 231 and determines if there are any pin pairs remaining in the current pass. If yes, the server returns to block 209 to select another pin pair for the client providing the incorporated route. If no, the server proceeds to block 233. At block 233, the server determines whether it is to make another pass through the netlist. For example, a design rule may require that no route have more than a specified number of vias under any circumstance. After the server makes a number of passes equal to that specified number plus one pass for no-via routes, the server makes no more passes. In such a case, the server would proceed from the "no" branch of block 233 to block 237. At block 237, the server generates a report indicating which pin pairs (if any) have not been routed, and then terminates the routing session. If there are additional passes to be made through the netlist (the "yes" branch of block 233), the server increments the pass counter p at block 235, and then returns to block 207 to begin the new pass. During the next pass, clients will be instructed to route pin pairs using p vias.

In general, the processing time needed to perform a DRC and carry out other tasks performed by the server is much less than the time needed by a client to route a single pin pair. Accordingly, the server will often not need more processing power than the clients. If multiple edit requests arrive from clients in quick succession (block 215 of FIG. 17), those edit requests can be queued and handled by the server on a first in first out basis.

Figure 18:
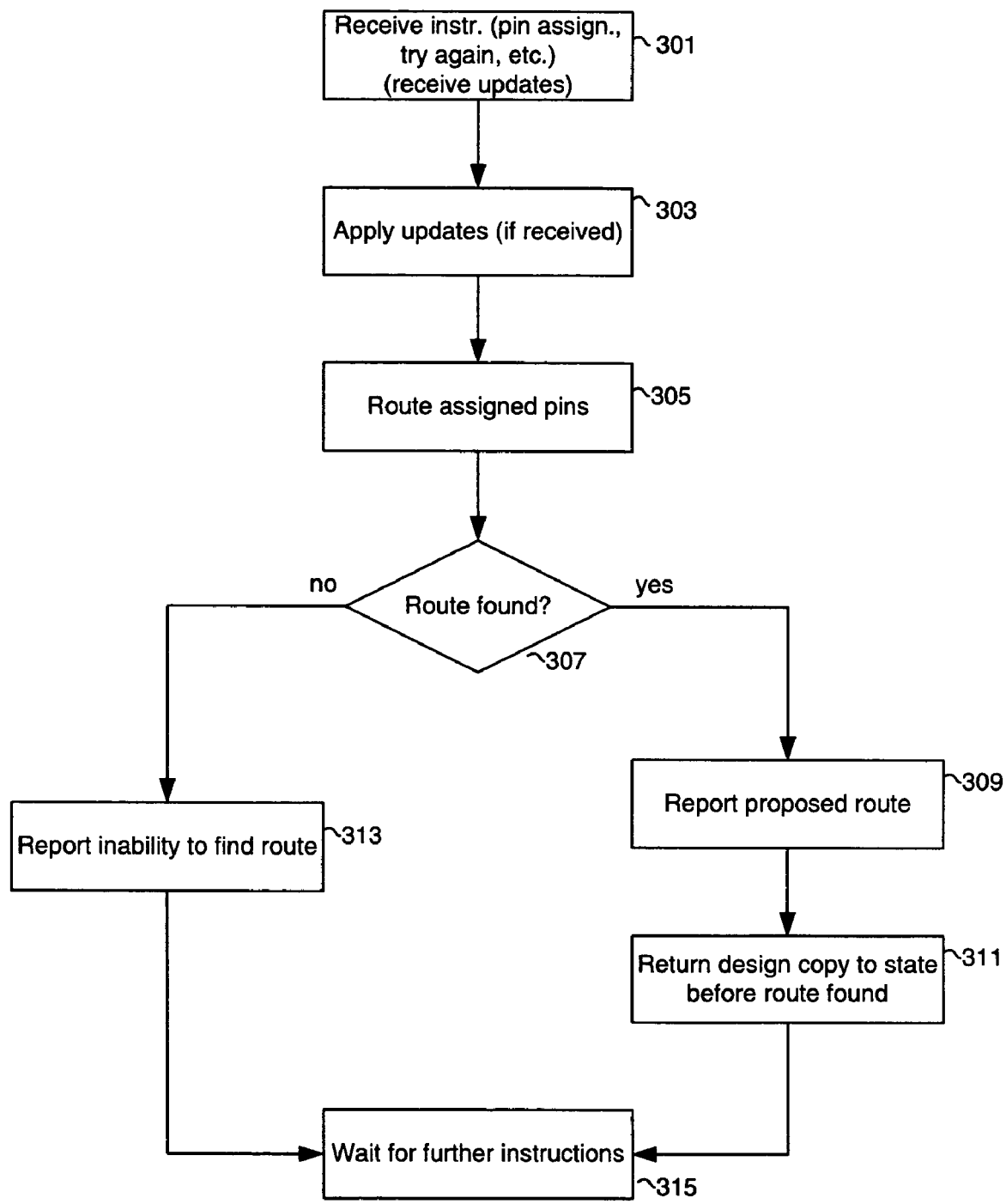
FIG. 18 is a flow chart for a method, according to at least some embodiments of the invention, for operating a client in a distributed autorouting session.

FIG. 18 is a flow chart for a method, according to at least some embodiments of the invention, for operating a client in a distributed autorouting session. Beginning at block 301, the client receives instructions from the server. Those instructions may be a new pin assignment, or may be an instruction to retry routing a pin pair (i.e., a reassignment of a pin pair). The client also receives any restrictions imposed by the server on possible connections (e.g., via limitations), and may also receive one or more updates for the copy of the PCB design maintained by the client. At block 303, updates (if any) received in block 301 are applied to the client copy of the PCB design. At block 305, the client begins using one or more routing algorithms to find a route connecting the assigned pin pair. Based on those routing algorithm(s), the client finds a route or determines that a connection between the pins cannot be found (e.g., because of a current via limitation). In some embodiments, the client might also be configured to stop attempting to route a connection after a certain amount of time, and to report an inability to route based on the time required. From block 305, the client proceeds to block 307. If the client found a route for the assigned pin pair at block 305, the client proceeds on the "yes" branch to block 309. At block 309, the client forwards an edit request to the server containing the found route. At block 311 the client returns its copy of the PCB design to the condition of that copy prior to block 305, but after block 303. From block 311, the client returns to block 315 and awaits further instructions from the server. If the client was unable to find a route for the assigned pin pair (or timed out) at block 305, the client proceeds on the "no" branch from block 307 to block 313. At block 313, the client reports the inability to route the pin pair connection. The client then proceeds to block 315 to await further instructions.

Figure 19:
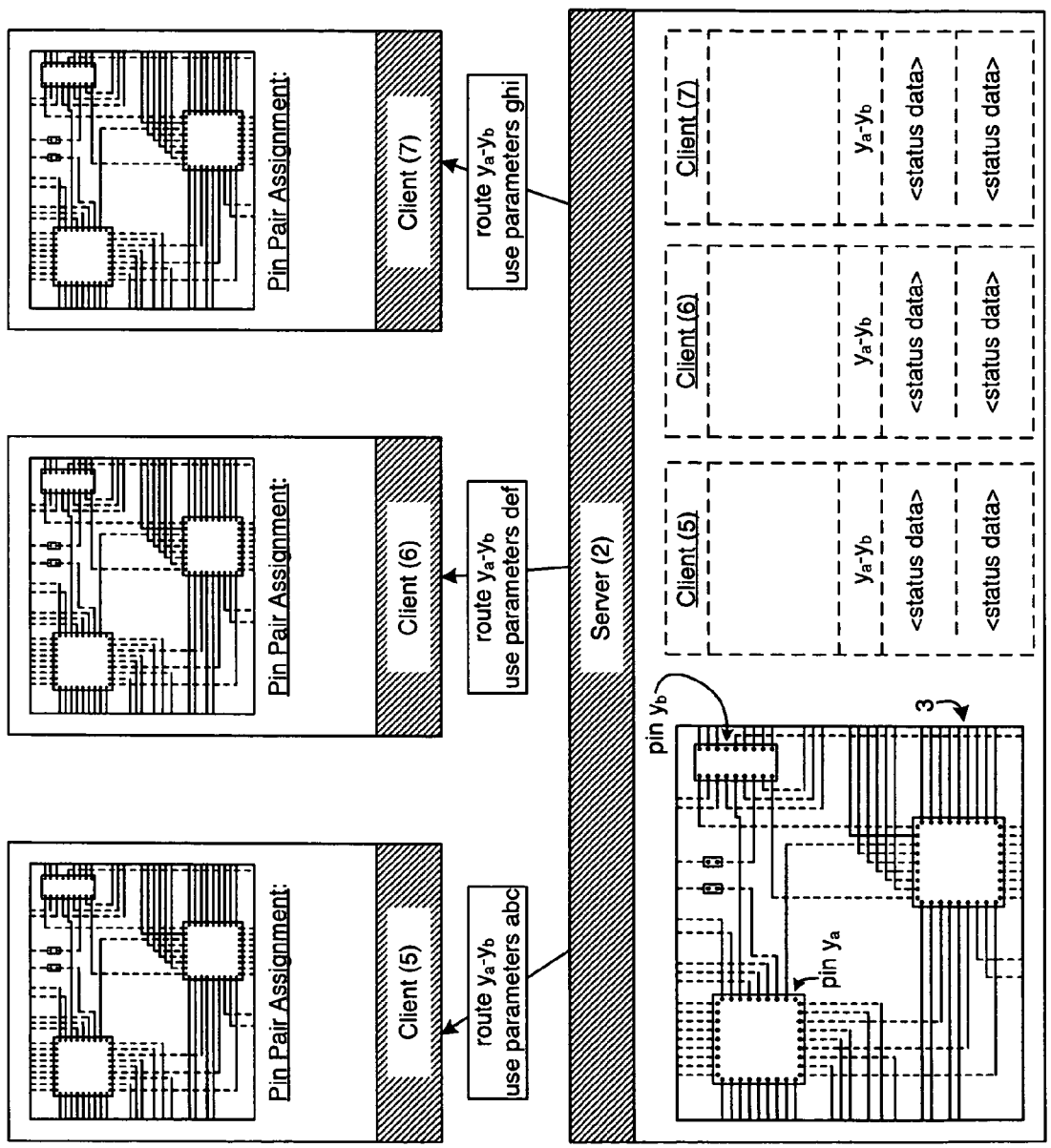
FIG. 19 illustrates assignment of the same pin pair to multiple clients according to at least some embodiments of the invention.

In some embodiments, and as shown in FIG. 19, the server may assign the same pin pair ($y_a$–$y_b$) to multiple clients for routing. In some cases, the routing session may be nearing completion, and there may be more clients than unrouted pin pairs. In other cases, it may be desirable to develop alternate routes for comparison. The amount of processing time needed to route a pin pair connection can greatly increase as more pin connections are added. If more clients attempt to solve the same routing problem, a solution may potentially be found more quickly. In this regard, and as shown in FIG. 19, the clients may be given different parameters for routing the same pin pair. As but one example, one client may be allowed to use as many vias as necessary, while another may be allowed to use a multi-directional trace occupying a single PCB layer (i.e., that changes direction without use of a via). As but another example, one client may be allowed to rip up and reroute a certain subset of routes, while another client is allowed to rip up and reroute another set of routes. Clients may also be given routing assignments having different component placements, different routing schemes, different connection schedules, or other differing parameters. In still other embodiments, a client routing a pin pair is advised of routes suggested by another client routing the same pin pair so as to avoid duplication of effort. The status of clients routing the same pin pair may be monitored to, e.g., determine which set of routing parameters permits more rapid progress.

Although several examples of carrying out the invention have been described, those skilled in the art will appreciate that there are numerous variations and permutations of the above described examples that fall within the spirit and scope of the invention as set forth in the appended claims. The algorithms, system configurations and other aspects described are merely examples. Modifications of the described algorithms, systems and aspects are within the scope of the invention, as are numerous other algorithms, configurations and aspects. For example, previously-described embodiments assign a single pin pair to each client computer, but the invention is not limited to such embodiments. In other embodiments, a server may include two (or more) pin pairs in a particular autorouting assignment directed to a particular client. The client then returns proposed routes for some or all of those pin pairs. Accordingly, use of the singular form in the following claims should not be construed in an exclusive manner (e.g., "a" does not mean "only one"). As but another example, a client computer finding a route between two pins need not return its copy of a PCB design to an earlier condition immediately upon forwarding an edit request to a server. Instead, the client could allow its found route to remain; if the server rejects the found route, the client could remove the found route upon receiving the rejection. Additionally, it is to be understood that the term "processor" as used herein (including the claims) is not limited to a single processor, and but rather encompasses also multiple processors working together to perform inter-related processing functions.

The invention claimed is:

1. A method for routing conductive paths for a printed circuit board (PCB), comprising:
 (a) automatically assigning, from a list of component pin pairs for an electronic circuit, a different component pin pair to each of a plurality of client computers configured to automatically route a conductive path between two component pins;
 (b) receiving, from each client of the plurality of clients, a proposed route for a conductive path connecting the pin pair assigned to the client;
 (c) incorporating the proposed routes into a master PCB design; and
 (d) repeating steps (a) through (c) so as to receive from the clients and incorporate into said master PCB design proposed routes for additional component pin pairs from the list of component pin pairs.

2. The method of claim 1, further comprising:
 (e) forwarding update messages to the clients of the plurality of clients, the update messages indicating incorporation of proposed routes into a master copy of a PCB design and permitting the clients to include the incorporated routes into local copies of the PCB design maintained by the clients.

3. The method of claim 2, wherein step (e) comprises forwarding update messages to a client of the plurality of clients permitting said client to include incorporated routes into the local PCB design copy for said client, said incorporated routes being previously proposed by said client.

4. The method of claim 1, further comprising:
 (e) generating, upon incorporation of a proposed route into the master PCB design, an update indicating incorporation of the route; and
 (f) forwarding the update to each client of the plurality of clients when that client is not routing an assigned pin pair.

5. The method of claim 4, wherein
 step (e) comprises generating a separate update message upon incorporation of each of multiple proposed routes into the PCB master design copy,
 step (e) further comprises placing each update message in update queues for the clients of the plurality of clients, and
 step (f) comprises forwarding the contents of the update queue for that client when that client is not routing an assigned pin pair.

6. The method of claim 1, further comprising:
 (e) repeating steps (a) through (c) as part of making multiple passes throught the list of component pin pairs.

7. The method of claim 6, wherein
 step (a) comprises, during one of the passes through the list of component pin pairs, instructing clients to route assigned pin pairs and imposing a limit upon the number of vias permitted in a proposed route, and
 step (a) further comprises, during subsequent passes through the list of component pin pairs, instructing clients to route assigned pin pairs and imposing different limits upon the number of vias permitted in a proposed route.

8. The method of claim 1, wherein
 step (a) comprises assigning pin pairs from the list of component pin pairs based at least in part on distances separating the pins within the pin pairs.

9. The method of claim 1, wherein
 step (a) comprises assigning pin pairs from the list of component pin pairs based at least in part on relative locations of different pin pairs.

10. The method of claim 9, wherein step (a) further comprises assigning pin pairs from the list of component pin pairs based at least in part on the amount of overlap between polygons formed from pin locations of different pin pairs.

11. The method of claim 1, wherein
 step (a) comprises assigning pin pairs from the list of component pin pairs based at least in part on distances separating the pins within the pin pairs, and
 step (a) further comprises assigning pin pairs from the list of component pin pairs based at least in part on relative locations of different pin pairs.

12. The method of claim 1, further comprising:
 (e) assigning a component pin pair to a first client of the plurality of clients and assigning the same pin pair to a second client of the plurality of clients such that the first and second clients simultaneously attempt to route a conductive path between the pins of the assigned pin pair.

13. The method of claim 12, wherein step (e) comprises assigning the pin pair to the first client with a first set of routing parameters and assigning the pin pair to the second client with a second set of routing parameters.

14. The method of claim 1, further comprising:
 (e) receiving, from a client X of the plurality of clients, a proposed route for a conductive path connecting pin pair N assigned to client X;
 (f) rejecting the proposed route received in step (e);
 (g) forwarding an update message to client X indicating rejection of the proposed route received in step (e);
 (h) receiving a different proposed route for pin pair N from client X; and
 (i) incorporating the proposed route received in step (h) into the master PCB design.

15. The method of claim 14, further comprising:
 (j) receiving, from a client Y of the plurality of clients and prior to (e), a proposed route for a conductive path connecting pin pair M assigned to client Y;
 (k) incorporating the proposed route received in step (j) into the master PCB design; and
 (l) generating an update message indicating incorporation of the proposed route in step (k), and wherein
 step (g) includes forwarding the update message indicating rejection of the proposed route received in step (e) with the update message indicating incorporation of the proposed route in step (k).

16. A machine-readable medium having stored thereon data representing sequences of instructions which, when executed by a processor, cause the processor to perform steps comprising:
 (a) automatically assigning, from a list of component pin pairs for an electronic circuit, a different component pin pair to each of a plurality of client computers configured to automatically route a conductive path between two component pins;
 (b) receiving, from each client of the plurality of clients, a proposed route for a conductive path connecting the pin pair assigned to the client;
 (c) incorporating the proposed routes into a master PCB design and (d) repeating steps (a) through (c) so as to receive from the clients and incorporate into said master PCB design propose routes for additional component pin pairs from the list of component pin pairs.

17. The machine-readable medium of claim 16, comprising further instructions for performing steps comprising:
(e) forwarding update messages to the clients of the plurality of clients, the update messages indicating incorporation of proposed routes into a master copy of a PCB design and permitting the clients to include the incorporated routes into local copies of the PCB design maintained by the clients.

18. The machine-readable medium of claim 17, wherein step (e) comprises forwarding update messages to a client of the plurality of clients permitting said client to include incorporated routes into the local PCB design copy for said client, said incorporated routes being previously proposed by said client.

19. The machine-readable medium of claim 16, comprising further instructions for performing steps comprising:
(e) generating, upon incorporation of a proposed route into the master PCB design, an update indicating incorporation of the route; and
(f) forwarding the update to each client of the plurality of clients when that client is not routing an assigned pin pair.

20. The machine-readable medium of claim 19, wherein step (e) comprises generating a separate update message upon incorporation of each of multiple proposed routes into the PCB master design copy,
step (e) further comprises placing each update massage in update queues for the clients of the plurality of clients, and
step (f) comprises forwarding the contents of the update queue for that client when that client is not routing an assigned pin pair.

21. The machine readable medium of claim 16, comprising further instructions for performing steps comprising:
(e) repeating steps (a) through (c) as part of making multiple passes through the list of component pin pairs.

22. The machine-readable medium of claim 21, wherein step (a) comprises, during one of the passes through the list of component pin pairs, instructing clients to route assigned pin pairs and imposing a limit upon the number of vias permitted in a proposed route, and
step (a) further comprises, during subsequent passes through the list of component pin pairs, instructing clients to route assigned pin pairs and imposing different limits upon the number of vias permitted in a proposed route.

23. The machine-readable medium of claim 16, wherein step (a) comprises assigning pin pairs from the list of component pin pairs based at least in part on distances separating the pins within the pin pairs.

24. The machine-readable medium of claim 16, wherein step (a) comprises assigning pin pairs from the list of component pin pairs based at least in part on relative locations of different pin pairs.

25. The machine-readable medium of claim 24, wherein step (a) further comprises assigning pin pairs from the list of component pin pairs based at least in part on the amount of overlap between polygons formed from pin locations of different pin pairs.

26. The machine-readable medium of claim 16, wherein
step (a) comprises assigning pin pairs from the list of component pin pairs based at least in part on distances separating the pins within the pin pairs, and
step (a) further comprises assigning pin pairs from the list of component pin pairs based at least in part on relative locations of different pin pairs.

27. The machine-readable medium of claim 16, comprising further instructions for performing steps comprising:
(e) assigning a component pin pair to a first client of the plurality of clients and assigning the same pin pair to a second client of the plurality of clients such that the first and second clients simultaneously attempt to route a conductive path between the pins of the assigned pin pair.

28. The machine-readable medium of claim 27, wherein step (e) comprises assigning the pin pair to the first client with a first set of routing parameters and assigning the pin pair to the second client with a second set of routing parameters.

29. The machine-readable medium of claim 16, comprising further instructions for performing steps comprising:
(e) receiving, from a client X of the plurality of clients, a proposed route for a conductive path connecting pin pair N assigned to client X;
(f) rejecting the proposed route received in step (e);
(g) forwarding an update message to client X indicating rejection of the proposed route received in step (e);
(h) receiving a different proposed route for pin pair N from client X; and
(i) incorporating the proposed route received in step (h) into the master PCB design.

30. The machine-readable medium of claim 16, comprising further instructions for performing steps comprising:
(j) receiving, from a client Y of the plurality of clients and prior to (e), a proposed route for a conductive path connecting pin pair M assigned to client Y;
(k) incorporating the proposed route received in step (j) into the master PCB design; and
(l) generating an update message indicating incorporation of the proposed route in step (k), and wherein
step (g) includes forwarding the update message indicating rejection of the proposed route received in step (e) with the update message indicating incorporation of the proposed route in step (k).

* * * * *